United States Patent
Hwang et al.

(10) Patent No.: US 12,082,109 B2
(45) Date of Patent: Sep. 3, 2024

(54) METHOD FOR TRANSMITTING AND RECEIVING DOWNLINK CHANNEL AND DEVICE THEREFOR

(71) Applicant: LG ELECTRONICS INC., Seoul (KR)

(72) Inventors: Daesung Hwang, Seoul (KR); Inkwon Seo, Seoul (KR); Yunjung Yi, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 731 days.

(21) Appl. No.: 17/273,564

(22) PCT Filed: Sep. 9, 2019

(86) PCT No.: PCT/KR2019/011610
§ 371 (c)(1),
(2) Date: Mar. 4, 2021

(87) PCT Pub. No.: WO2020/060089
PCT Pub. Date: Mar. 26, 2020

(65) Prior Publication Data
US 2021/0266828 A1    Aug. 26, 2021

(30) Foreign Application Priority Data

Sep. 21, 2018 (KR) .................. 10-2018-0114335
Sep. 21, 2018 (KR) .................. 10-2018-0114392
Sep. 21, 2018 (KR) .................. 10-2018-0114430

(51) Int. Cl.
*H04W 4/00* (2018.01)
*H04L 5/00* (2006.01)
(Continued)

(52) U.S. Cl.
CPC .......... *H04W 52/0212* (2013.01); *H04L 5/001* (2013.01); *H04L 5/0092* (2013.01); *H04W 72/23* (2023.01)

(58) Field of Classification Search
CPC ............. H04W 52/0212; H04W 72/23; H04W 72/0453; H04W 8/24; H04W 52/02
See application file for complete search history.

(56) References Cited

U.S. PATENT DOCUMENTS

| | | | |
|---|---|---|---|
| 2012/0039227 A1* | 2/2012 | Chen ...................... | H04L 5/0098 455/522 |
| 2012/0155407 A1* | 6/2012 | Lindoff ................ | H04W 72/02 370/329 |
| 2021/0204214 A1* | 7/2021 | Chang ............... | H04W 72/1263 |

FOREIGN PATENT DOCUMENTS

| | | |
|---|---|---|
| KR | 1020120093913 A | 8/2012 |
| KR | 20170118761 A | 10/2017 |

(Continued)

*Primary Examiner* — Omoniyi Obayanju
(74) *Attorney, Agent, or Firm* — BRYAN CAVE LEIGHTON PAISNER LLP

(57) ABSTRACT

The present invention discloses a method for receiving, by means of a terminal, a downlink channel in a wireless communication system. In particular, the method may receive information about a plurality of component carriers, transmit information related to power consumption of a component carrier group including at least one first component carrier among the plurality of component carriers, and receive a downlink channel through at least one second component carrier activated on the basis of the information related to power consumption.

13 Claims, 23 Drawing Sheets

(51) Int. Cl.
*H04W 52/02* (2009.01)
*H04W 72/23* (2023.01)

(56) References Cited

FOREIGN PATENT DOCUMENTS

WO 2012036378 A2 3/2012
WO 2014115989 A1 7/2014

* cited by examiner

FIG. 1
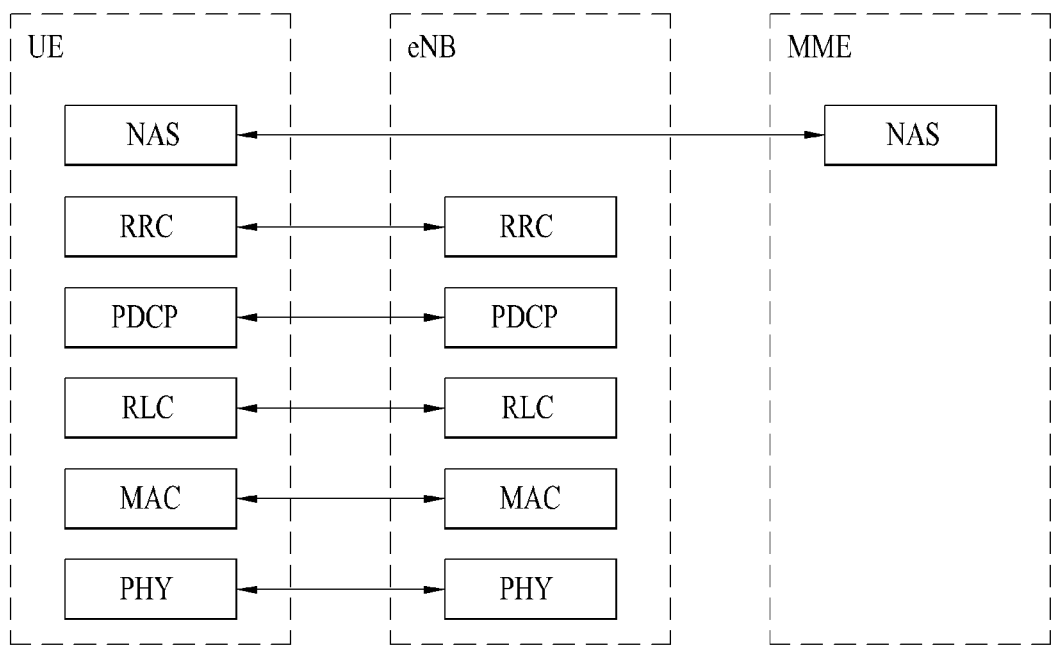
(A) CONTROL-PLANE PROTOCOL STACK
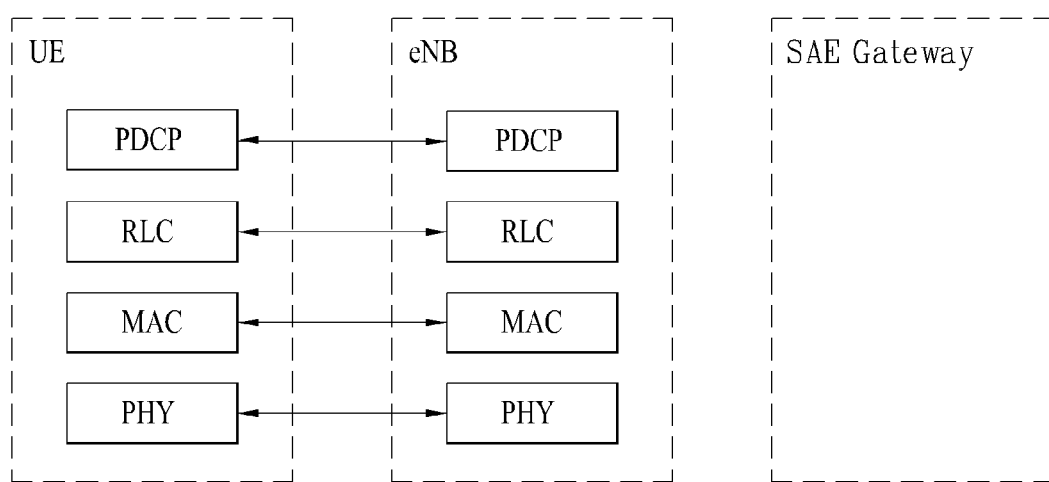
(B) USER-PLANE PROTOCOL STACK

METHOD FOR TRANSMITTING AND RECEIVING DOWNLINK CHANNEL AND DEVICE THEREFOR

This application is the National Stage filing under 35 U.S.C. 371 of International Application No. PCT/KR2019/011610, filed on Sep. 9, 2019, which claims priority to Korean Patent Application Nos. 10-2018-0114335, filed on Sep. 21, 2018; 10-2018-0114392, filed on Sep. 21, 2018 and 10-2018-0114430, filed on Sep. 21, 2018, the contents of which are all hereby incorporated by reference herein in their entirety.

TECHNICAL FIELD

The present disclosure relates to a method for transmitting and receiving a downlink channel and a device therefor, and more particularly, to a method for transmitting and receiving a downlink channel by a terminal through power consumption of a terminal optimized based on implementation information or assistance information reported by the terminal to a base station, and a device therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IOT)).

DISCLOSURE

Technical Problem

An object of the present disclosure is to provide a method for transmitting and receiving a downlink channel and a device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, provided herein is a method for receiving a downlink channel by a user equipment (UE) in a wireless communication system. The method may include receiving information related to a plurality of component carriers, transmitting information related to power consumption of a component carrier group including at least one first component carrier among the plurality of component carriers, and receiving the downlink channel through at least one second component carrier activated based on the information related to the power consumption.

Here, the information related to the power consumption may be a value for power consumption of the UE calculated based on the at least one first component carrier being activated.

In addition, the information related to the power consumption may be determined based on an active bandwidth part (BWP) of the at least one first component carrier.

The information related to the power consumption may include values obtained by measuring a power consumption level for a bandwidth of the at least one first component carrier in units of a specific number of resource blocks (RBs).

The at least one first component carrier may be associated with the same radio frequency (RF) circuit.

The UE may be capable of communicating with at least one of anther UE, a network, a base station, and an autonomous driving vehicle.

In another aspect of the present disclosure, provided herein is an apparatus for receiving a downlink channel in a wireless communication system. The apparatus may include at least one processor, and at least one computer memory operably connectable to the at least one processor and storing instructions that, when executed by the at least one processor, perform operations comprising: receiving information related to a plurality of component carriers, transmitting information related to power consumption of a component carrier group including at least one first component carrier among the plurality of component carriers, and receiving the downlink channel through at least one second component carrier activated based on the information related to the power consumption.

Here, the information related to the power consumption may be a value for power consumption of the UE calculated based on the at least one first component carrier being activated.

The information related to the power consumption may be determined based on an active bandwidth part (BWP) of the at least one first component carrier.

The information related to the power consumption may include values obtained by measuring a power consumption level for a bandwidth of the at least one first component carrier in units of a specific number of resource blocks (RBs).

The at least one first component carrier may be associated with the same radio frequency (RF) circuit.

The apparatus may be capable of communicating with at least one of a user equipment (UE), a network, a base station, and an autonomous driving vehicle.

In another aspect of the present disclosure, provided herein is a user equipment (UE) for receiving a downlink channel in a wireless communication system. The UE may include at least one transceiver, at least one processor, and at least one computer memory operably connectable to the at least one processor and storing instructions that, when executed by the at least one processor, perform operations comprising: receiving information related to a plurality of component carriers through the at least one transceiver, transmitting, through the at least one transceiver, information related to power consumption of a component carrier group including at least one first component carrier among the plurality of component carriers, and receiving, through the at least one transceiver, the downlink channel through at least one second component carrier activated based on the information related to the power consumption.

Advantageous Effects

According to the present disclosure, a base station may perform downlink channel configuration and scheduling for a terminal based on implementation information or assistance information transmitted by the terminal to the base station, such that the terminal may efficiently consume power.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.

BEST MODE

Figure 2:
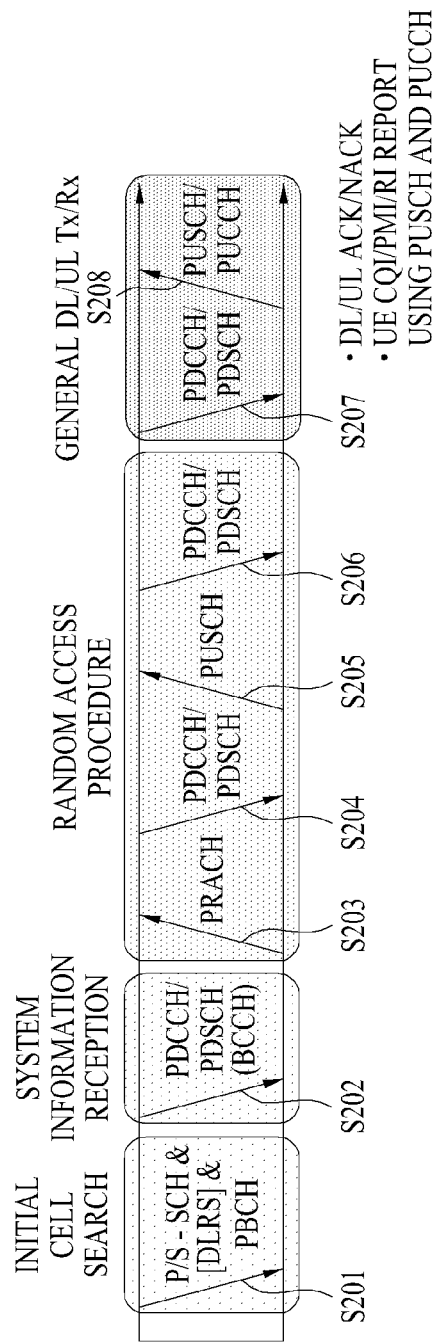
FIG. 2 is a diagram illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IOT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206).

In the case of a contention-based RACH, the UE may additionally perform a contention resolution procedure (S206).

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. In 3GPP, this system is called NR. In the present disclosure, the system will be referred to as an NR system.

In addition, the NR system uses an OFDM transmission scheme or a transmission scheme similar thereto. The NR system may conform to OFDM parameters different from the OFDM parameters of LTE. Alternatively, the NR system may conform to the existing LTE/LTE-A neurology, but may have a larger system bandwidth (e.g., 100 MHz). Alternatively, one cell may support a plurality of neurologies. In other words, UEs operating in different neurologies may coexist within one cell.

Figure 3:
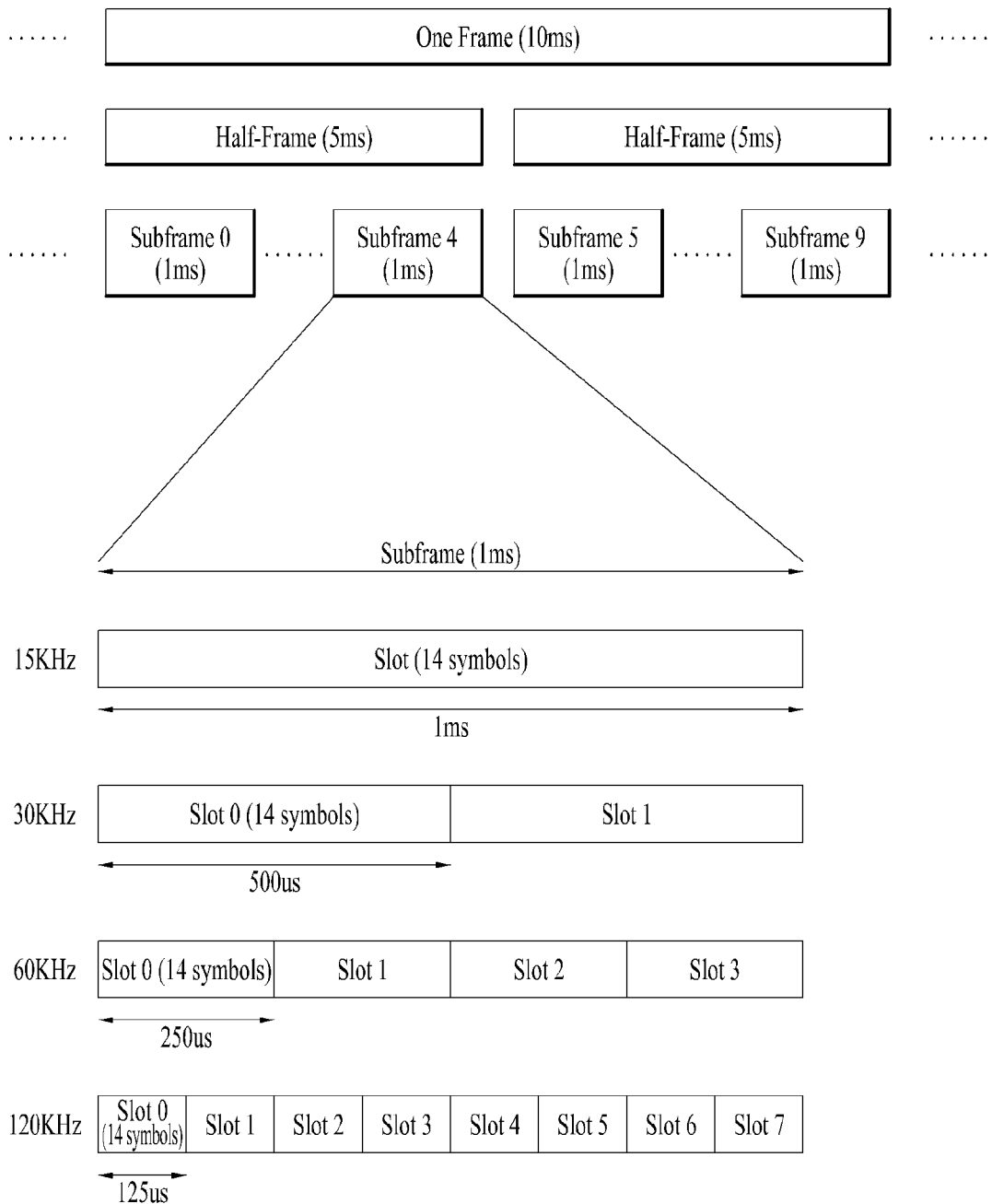
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
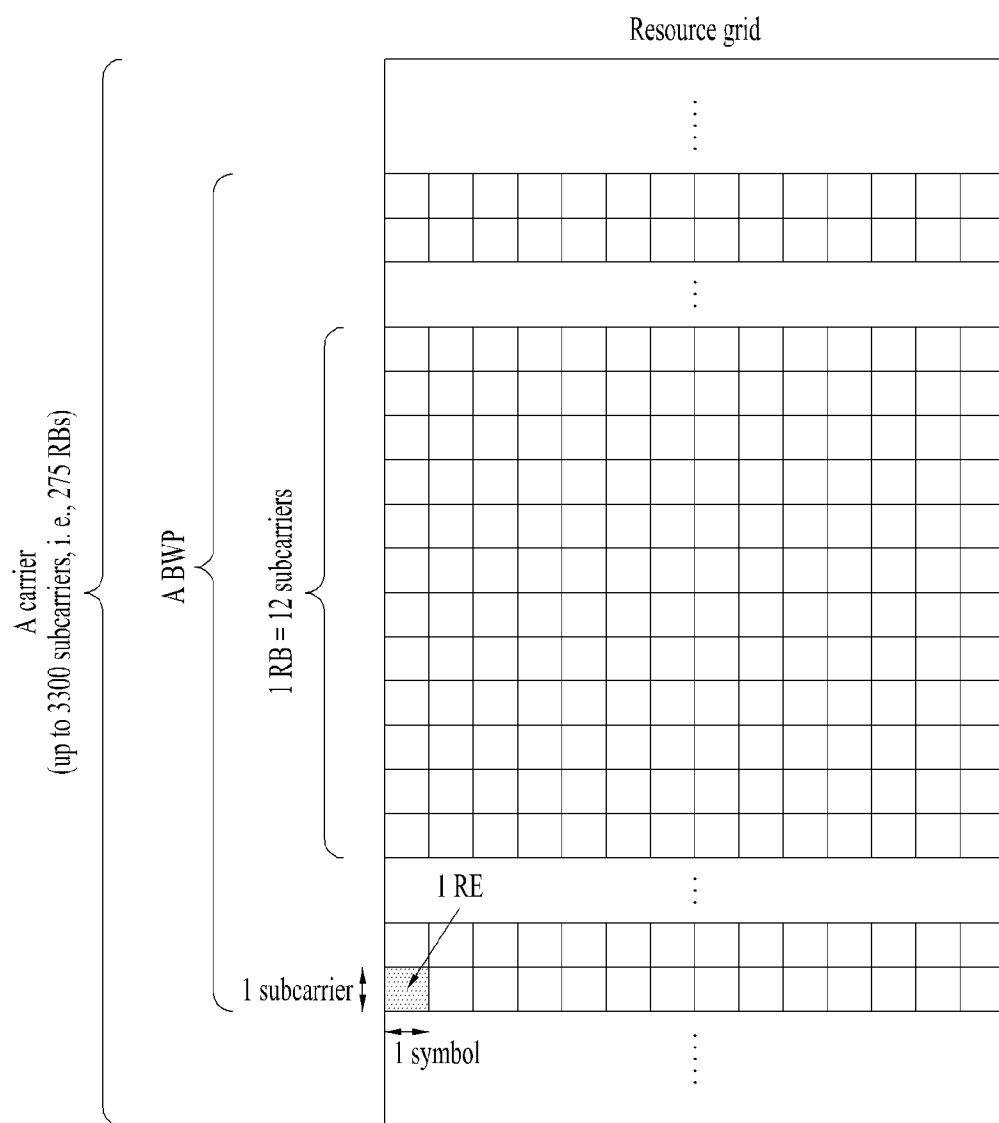

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
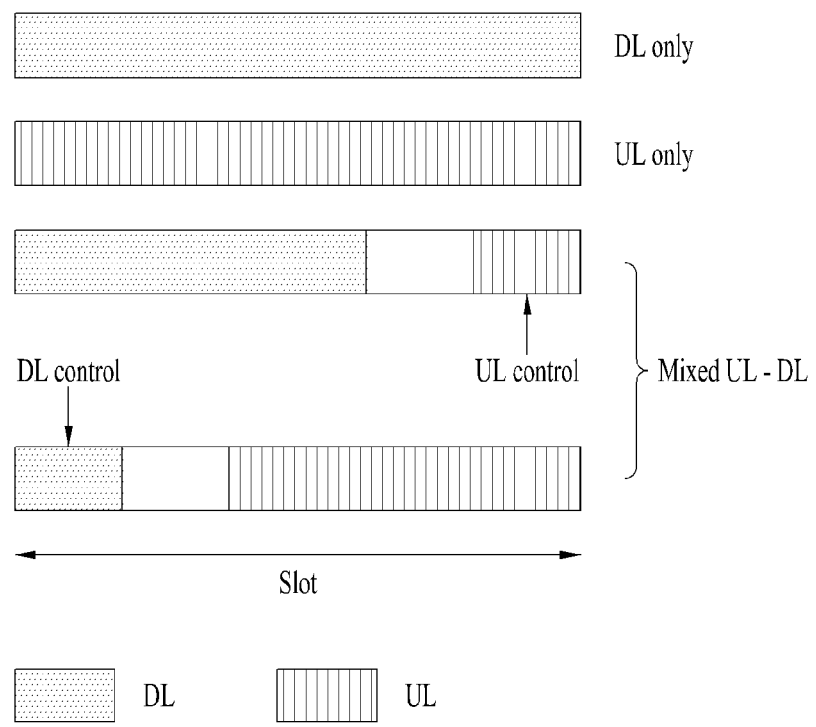

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+ DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
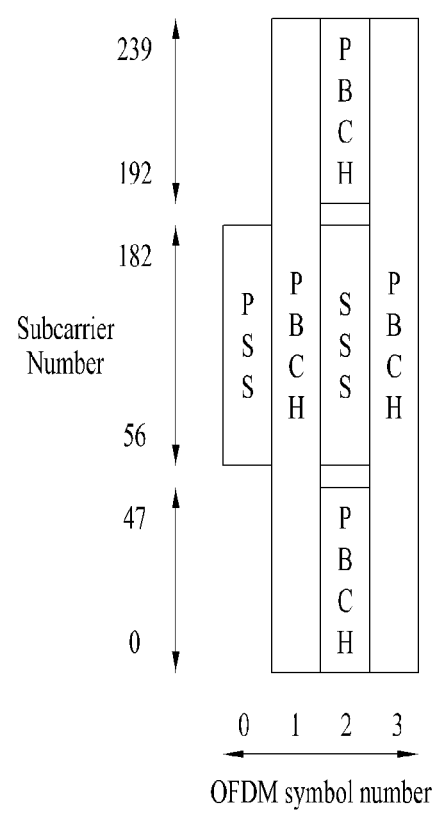
FIGS. 6 and 7 are diagrams illustrating the composition of a synchronization signal/physical broadcast channel (SS/PBCH) block and a method of transmitting an SS/PBCH block.

FIG. 6 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 6, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| 1$^{st}$ step | PSS | SS/PBCH block (SSB) symbol timing acquisition Cell ID detection within a cell ID group (3 hypothesis) |
| 2$^{nd}$ Step | SSS | Cell ID group detection (336 hypothesis) |
| 3$^{rd}$ Step | PBCH DMRS | SSB index and Half frame (HF) index (Slot and frame boundary detection) |
| 4$^{th}$ Step | PBCH | Time information (80 ms, System Frame Number (SFN), SSB index, HF) Remaining Minimum System Information (RMSI) Control resource set (CORESET)/Search space configuration |
| 5$^{th}$ Step | PDCCH and PDSCH | Cell access information RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 7:
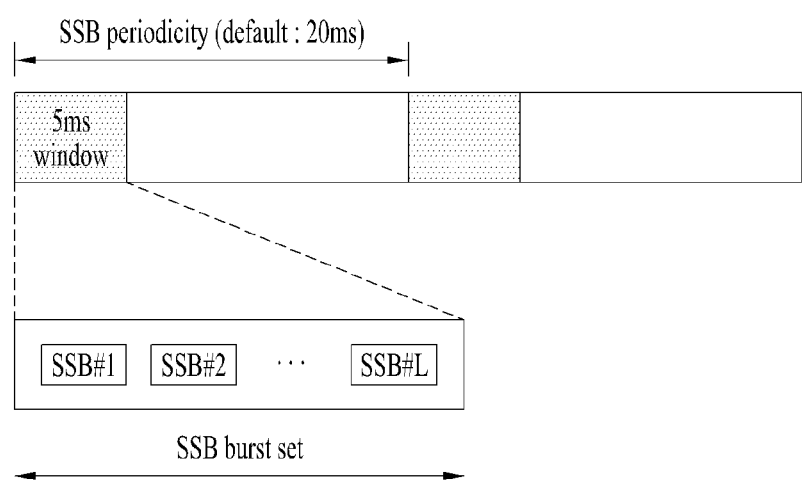

FIG. 7 illustrates SSB transmission. Referring to FIG. 7, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHZ, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L-1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHZ, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHZ, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHZ, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 8:
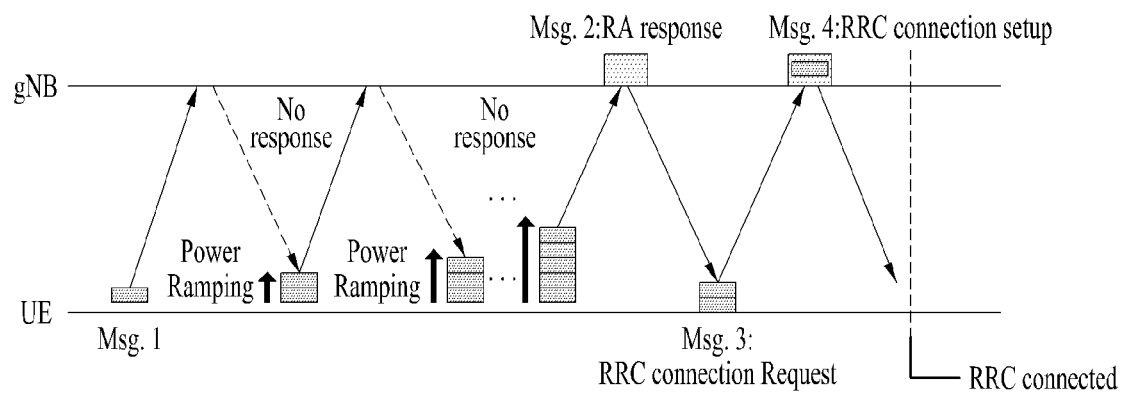
FIG. 8 is a diagram illustrating an example of a random access procedure.

The random access procedure of the UE may be summarized as shown in Table 4 and FIG. 8.

TABLE 4

| | Type of Signal | Operation/information acquired |
|---|---|---|
| Step 1 | PRACH preamble on UL | Initial beam acquisition Random access preamble ID selection |
| Step 2 | Random access response on PDSCH | Timing advance information Random access preamble ID Initial UL grant, temporary C-RNTI |
| Step 3 | UL transmission on PUSCH | RRC connection request UE identifier |
| Step 4 | Contention resolution on DL | Temporary C-RNTI on PDCCH for initial access C-RNTI on PDCCH for RRC_CONNECTED UE |

The random access procedure is used for various purposes. For example, the random access procedure may be used for initial network access, handover, and UE-triggered UL data transmission. The UE may acquire UL synchronization and UL transmission resources through a random access procedure. The random access procedure is divided into a contention-based random access procedure and a contention free random access procedure.

FIG. 8 is a diagram illustrating an example of a random access procedure. In particular, FIG. 8 illustrates a contention-based random access procedure.

First, the UE may transmit a random access preamble on the PRACH as Msg1 of the random access procedure on UL.

Random access preamble sequences having two different lengths are supported. Long sequence length 839 is applied for subcarrier spacing of 1.25 kHz and 5 kHz, and short sequence length 139 is applied for subcarrier spacing of 15 kHz, 30 kHz, 60 kHz and 120 KHz.

Multiple preamble formats are defined by one or more RACH OFDM symbols and different cyclic prefixes (and/or a guard time). RACH configuration for a cell is included in the system information of the cell and provided to the UE. The RACH configuration includes information on the subcarrier spacing of the PRACH, available preambles, and preamble formats. The RACH configuration includes information about association between SSBs and RACH (time-frequency) resources. The UE transmits a random access preamble on the RACH time-frequency resource associated with a detected or selected SSB.

An SSB threshold for RACH resource association may be set by the network, and transmission and retransmission of the RACH preamble are performed based on an SSB in which reference signal received power (RSRP) measured based on the SSB satisfies the threshold. For example, the UE may select one of SSB(s) satisfying the threshold, and transmit or retransmit the RACH preamble based on the RACH resource associated with the selected SSB.

When the BS receives the random access preamble from the UE, the BS transmits a random access response (RAR) message (Msg2) to the UE. A PDCCH for scheduling a PDSCH carrying the RAR is transmitted after being CRC masked with a random access (RA) radio network temporary identifier (RNTI) (RA-RNTI). Upon detecting the PDCCH masked with the RA-RNTI, the UE may receive the RAR from the PDSCH scheduled by DCI carried by the PDCCH. The UE checks whether RAR information for the preamble transmitted by the UE, that is, Msg1, is in the RAR. Whether there is random access information for Msg1 transmitted by the UE may be determined based on whether there is a RA preamble ID for the preamble transmitted by the UE. When there is no response to Msg1, the UE may retransmit the RACH preamble within a predetermined number of times while performing power ramping. The UE calculates the PRACH transmission power for the retransmission of the preamble based on the most recent path loss and power ramping counter.

When the UE receives the RAR information intended therefor on the PDSCH, the UE may recognize timing advance information for UL synchronization, an initial UL grant, and a UE temporary cell RNTI (cell RNTI (C-RNTI)). The timing advance information is used to control the uplink signal transmission timing. In order to better align the PUSCH/PUCCH transmission by the UE with the subframe timing at the network side, the network (e.g., the BS) may measure the time difference between PUSCH/PUCCH/SRS reception and subframes, and send timing advance information based on the measured difference. The UE may perform UL transmission as Msg3 in a random access procedure on an uplink shared channel based on the RAR information. Msg3 may include an RRC connection request and a UE identifier. In response to Msg3, the network may transmit Msg4, which may be treated as a contention resolution message on DL. By receiving Msg4, the UE may enter the RRC connected mode.

The contention-free random access procedure may be used when the UE performs handover to another cell or BS or the procedure is requested by a command from the BS. The basic process of the contention-free random access procedure is similar to the contention-based random access procedure. However, in the contention-free random access procedure, a preamble to be used by the UE (hereinafter, a dedicated RA preamble) is assigned to the UE by the BS, unlike in the contention-based random access procedure, in which the UE randomly selects a preamble to use among a plurality of RA preambles. Information on the dedicated RA preamble may be included in an RRC message (e.g., a handover command) or may be provided to the UE through a PDCCH order. When the RA procedure is initiated, the UE transmits the dedicated RA preamble to the BS. When the UE receives the RA procedure from the BS, the RA procedure is completed.

As mentioned above, the UL grant in the RAR schedules PUSCH transmission for the UE. The PUSCH carrying the initial UL transmission by the UL grant in the RAR is also referred to as Msg3 PUSCH. The content of the RAR UL grant starts at the MSB and ends at the LSB, and is given in Table 5.

TABLE 5

| RAR UL grant field | Number of bits |
| --- | --- |
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The TPC command is used to determine the transmit power of the Msg3 PUSCH, and is interpreted according to, for example, Table 6.

TABLE 6

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, the CSI request field in the RAR UL grant indicates whether the UE will include aperiodic CSI report in the PUSCH transmission. The subcarrier spacing for Msg3 PUSCH transmission is provided by the RRC parameter. The UE will transmit the PRACH and Msg3 PUSCH on the same uplink carrier of the same serving cell. The UL BWP for Msg3 PUSCH transmission is indicated by System Information Block1 (SIB1).

Figure 9:
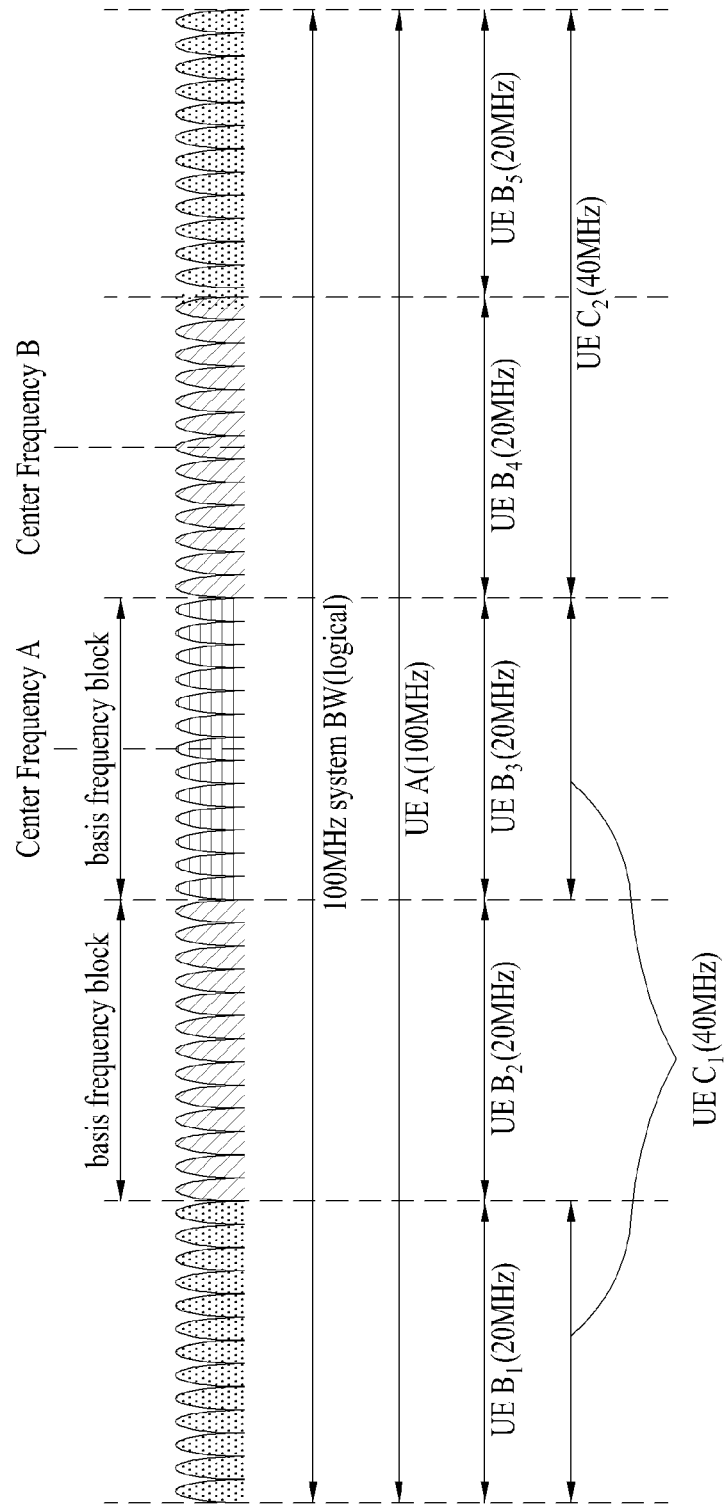
FIG. 9 is a conceptual diagram illustrating a carrier aggregation technique.

FIG. 9 is a conceptual diagram illustrating carrier aggregation. Carrier aggregation refers to a method by which a UE uses a plurality of frequency blocks or cells (in a logical sense) composed of uplink resources (or component carriers) and/or downlink resources (or component carriers) as one large logical frequency band in order for a wireless communication system to use a wider frequency band. Hereinafter, for simplicity, the term "component carrier" will be used.

For example, referring to FIG. 9, when the system bandwidth (system BW) has a bandwidth of up to 100 MHz as a logical band, the entire system band may include five component carriers, and each of the component carriers may have a bandwidth of up to 20 MHz. The component carrier includes one or more contiguous subcarriers that are physically contiguous. FIG. 9 illustrate that the component carriers have the same bandwidth, but this is merely an example. Each component carrier may have a different bandwidth. In addition, although the component carriers are illustrated as being adjacent to each other in the frequency domain, the figure merely illustrates a logical concept. The component carriers may be physically adjacent to each other or may be separated from each other.

The center frequency may be differently used for each component carrier, or one common center carrier may be used for physically adjacent component carriers. As an example, when it is assumed that all component carriers are physically adjacent to each other in FIG. 9, the center carrier A may be used. When it is assumed that the respective component carriers are not physically adjacent to each other, the center carrier A, the center carrier B, or the like may be used separately for each component carrier.

When the system band is extended by carrier aggregation, the frequency band used for communication with each UE is defined on a per component carrier basis. UE A may use 100 MHz, which is a system band, and perform communication using all five component carriers. UEs B1 to B5 may use only a 20 MHz bandwidth and perform communication using one component carrier. UEs C1 and C2 may use a 40 MHz bandwidth and perform communication using two component carriers, respectively. The two component carriers may or may not be logically/physically adjacent to each other. UE C1 represents a case where two non-adjacent component carriers are used, and UE C2 represents a case where two adjacent component carriers are used.

A method in which a control channel schedules a data channel may be classified into conventional linked carrier scheduling and cross carrier scheduling. More specifically, in the linked carrier scheduling, a control channel transmitted through a specific component carrier may schedule only a data channel through the specific component carrier, as in the legacy LTE system that uses a single component carrier. In the cross carrier scheduling, a control channel transmitted through a primary component carrier (CC) using a carrier indicator field (CIF) may schedule a data channel transmitted through the primary CC or another CC.

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH carries DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 10:
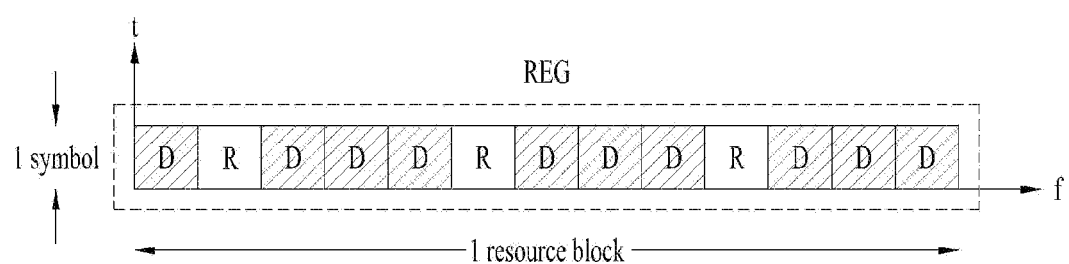
FIGS. 10, 11, and 12 are diagrams illustrating a physical downlink control channel (PDCCH) in the NR system.

FIG. 10 illustrates an exemplary structure of one REG. In FIG. 10, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figure 11:
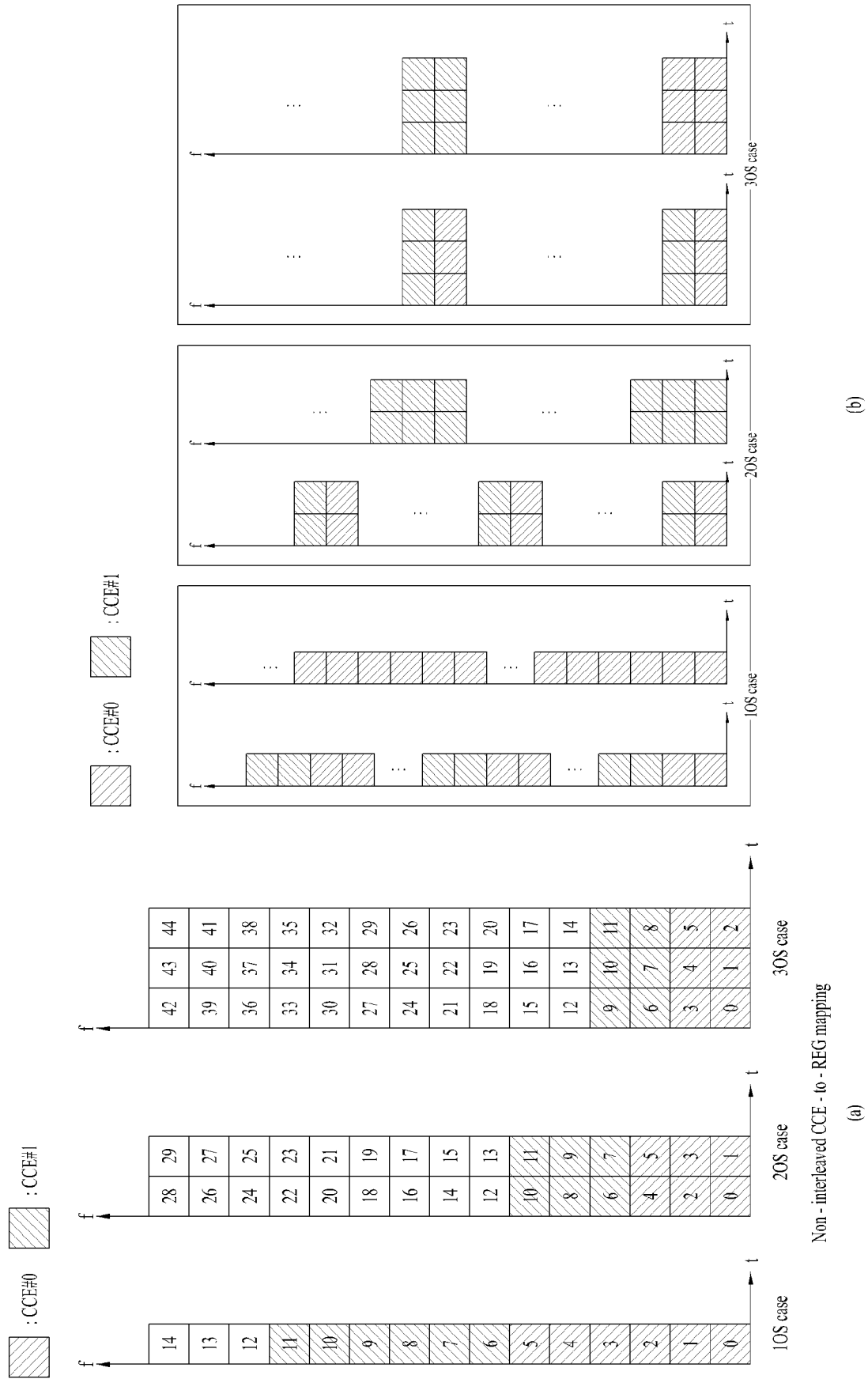

CCE-to-REG mapping for the CORESET may be an interleaved type or a non-interleaved type. FIG. 11(a) is an exemplary view illustrating non-interleaved CCE-REG mapping, and FIG. 11(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 12:
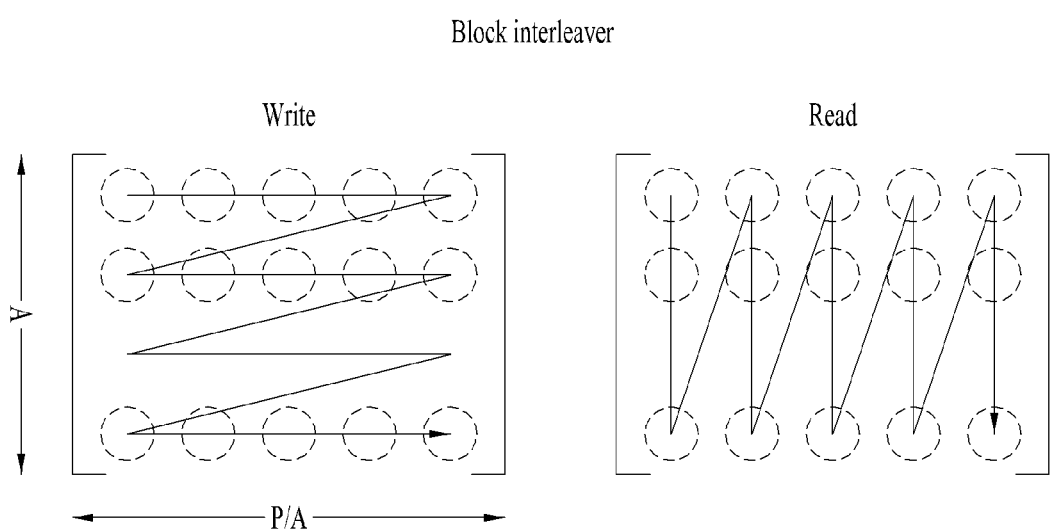

FIG. 12 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 12. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 7 lists exemplary features of the respective search space types.

TABLE 7

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 8 lists exemplary DCI formats transmitted on the PDCCH.

TABLE 8

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

UL Channel Structures

A UE transmits a related signal to the BS on a UL channel, which will be described later, and the BS receives the related signal from the UE through the UL channel to be described later.

(1) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

(2) Physical Uplink Control Channel (PUCCH)

The PUCCH carries UCI, HARQ-ACK and/or scheduling request (SR), and is divided into a short PUCCH and a long PUCCH according to the PUCCH transmission length. Table 9 exemplarily shows PUCCH formats.

TABLE 9

| PUCCH format | Length in OFDM symbols $N_{symb}^{PUCCH}$ | Number of bits | Usage | Etc. |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HAR, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

Multiplexing of Short PUCCH and Long PUCCH

Figure 13:
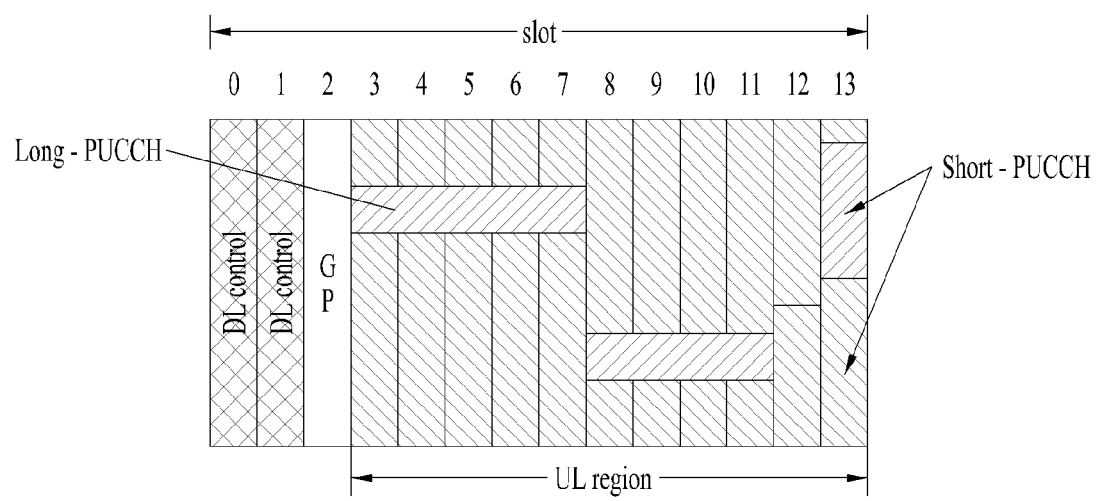
FIG. 13 is a diagram illustrating multiplexing of a long physical uplink control channel (long PUCCH) and a short PUCCH in an NR system.

FIG. 13 illustrates a configuration in which the short PUCCH and the long PUCCH are multiplexed with a UL signal.

The PUCCH (e.g., PUCCH format 0/2) and PUSCH may be multiplexed in a TDM or FDM scheme. A short PUCCH and a long PUCCH from different UEs may be multiplexed in the TDM or FDM scheme. Short PUCCHs from a single UE in one slot may be multiplexed in the TDM scheme. A short PUCCH and a long PUCCH from a single UE in one slot may be multiplexed in the TDM or FDM scheme.

Bandwidth Part (BWP)

The NR system may support up to 400 MHz per carrier. If a UE operating in such a wideband carrier always keeps a radio frequency (RF) module on for the whole carrier, the UE may suffer from great battery consumption. Considering multiple use cases (e.g., eMBB, URLLC, mMTC, V2X, etc.) in one wideband carrier, different numerologies (e.g., subcarrier spacings) may be supported for different frequency bands of the carrier. Each UE may have a different capability regarding a maximum bandwidth. In this regard, an eNB may indicate a UE to operate only in a part of the bandwidth of the wideband carrier, not across the total bandwidth. Such a partial bandwidth is referred to as a BWP. A BWP is a subset of contiguous common resource blocks defined for numerology $\mu_i$ in BWP i in the frequency domain, and one numerology (e.g., subcarrier spacing, CP length, or slot/mini-slot duration) may be configured for the BWP.

The gNB may configure one or more BWPs in one carrier configured for the UE. If UEs are concentrated in a specific BWP, some UEs may be switched to another BWP, for load balancing. For frequency-domain inter-cell interference cancellation between adjacent cells, BWPs at both ends of the total bandwidth of a cell except for some center spectrum may be configured in the same slot. That is, the gNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

Discontinuous Reception (DRX)

A UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Figure 14:
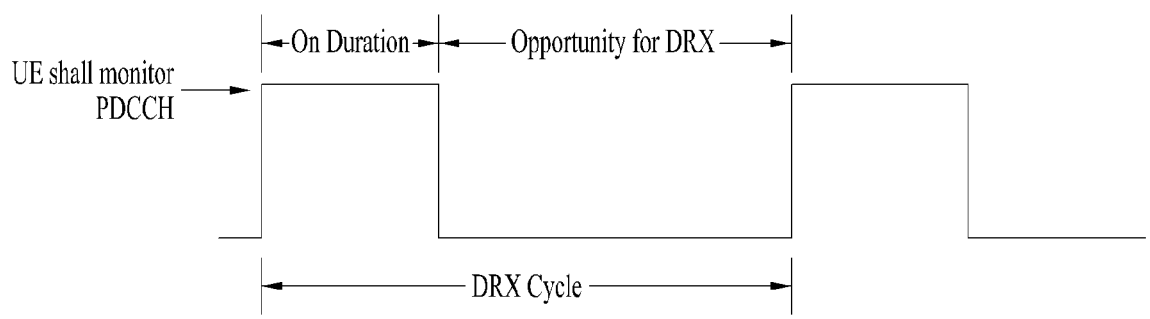
FIG. 14 is a diagram illustrating an embodiment of a discontinuous reception (DRX) operation.

FIG. 14 illustrates a DRX cycle (in the RRC_CONNECTED mode).

Referring to FIG. 14, a DRX cycle includes an On Duration and an Opportunity for DRX. The DRX cycle defines the time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH search spaces) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 10 describes a DRX operation of a UE (in the RRC_CONNECTED mode). Referring to Table U1, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 14.

TABLE 10

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig contains configuration information required to configure MAC parameters for a cell group. MAC-CellGroupConfig may also contain DRX configuration information. For example, MAC-CellGroupConfig may contain the following information for defining DRX.

Value of drx-onDurationTimer: Defines the duration of a time period at the beginning of a DRX cycle.

Value of drx-InactivityTimer: Defines the duration of a time period during which the UE is awake after a PDCCH occasion in which a PDCCH indicates an initial UL or DL user data transmission for the UE.

Value of drx-HARQ-RTT-TimerDL: Defines the duration of a maximum time period until a DL retransmission is received after reception of a DL initial transmission.

Value of drx-HARQ-RTT-TimerDL: Defines the duration of a maximum time period until a grant for a UL retransmission is received after reception of a grant for a UL initial transmission.

drx-LongCycleStartOffset: Defines the duration and starting time of a DRX cycle.

drx-ShortCycle (optional): Defines the duration of a short DRX cycle.

When any one of drx-OnDuration Timer, drx-Inactivity Timer, drx-HARQ-RTT-TimerDL, and drx-HARQ-RTT-TimerDL is running, the UE performs PDCCH monitoring in each PDCCH occasion, staying in the awake state.

In the New RAT (NR) system, UEs may support various operations such as carrier aggregation, e.g., intra-band carrier aggregation, use of a wideband or narrowband bandwidth (BWP), PDSCH decoding, and/or PUSCH encoding. Accordingly, various implementation methods of UEs according to various operations supported by the UEs.

For example, a UE supporting intra-band carrier aggregation may be implemented to support different radio frequencies each having a different component carrier (CC) or serving cell. In addition, another UE may be implemented such that a single radio frequency support a plurality of serving cells. In addition, even for the same active BWP, the configuration of a radio frequency for supporting the same may differ among UEs. Even in decoding the PDSCH, the number of transport blocks (TBs) or code blocks (CBs) which may be processed through parallel processing may differ among UEs.

In the NR system, in consideration of power saving of the UE, the BS may limit a specific processing time, a TB size, and/or a frequency range the number of resource blocks/resource block groups in which channel estimation is allowed. Alternatively, changing an activated serving cell to a deactivated or dormant state may be considered. However, the above-described methods may not obtain a large gain in terms of power saving, depending on the UE implementation, and may rather reduce throughput performance.

If the BS know the implementation information for the UE, it may efficiently transmit and receive a downlink signal or an uplink signal in consideration of a trade-off between power saving and performance loss. Therefore, the present disclosure proposes a method for reporting, by a UE, part or all of UE implementation information related to power saving of the UE to the BS. The present disclosure also proposes a power saving related operation performed by the UE based on the implementation information.

In the present disclosure, embodiments of the present disclosure will be described based on a PDSCH decoding scheme for simplicity. However, it should be noted that the embodiments of the present disclosure are applicable not only to decoding of the PDSCH but also to other UE operations such as PUSCH encoding or measurement/reporting. The present disclosure describes an embodiment in which a UE reports part or all of the UE implementation information to the BS and performs power saving related operation based thereon. It should be noted that the embodiment is applicable even to an embodiment in which the BS provides part or all of the network implementation information to the UE and power saving related operation is performed based thereon. It should also be noted that the proposed method described in the embodiments of the present disclosure and methods that may be derived from the method may be implemented through an apparatus, and the present disclosure also includes a description of an apparatus implementing the proposed method.

Figure 15:
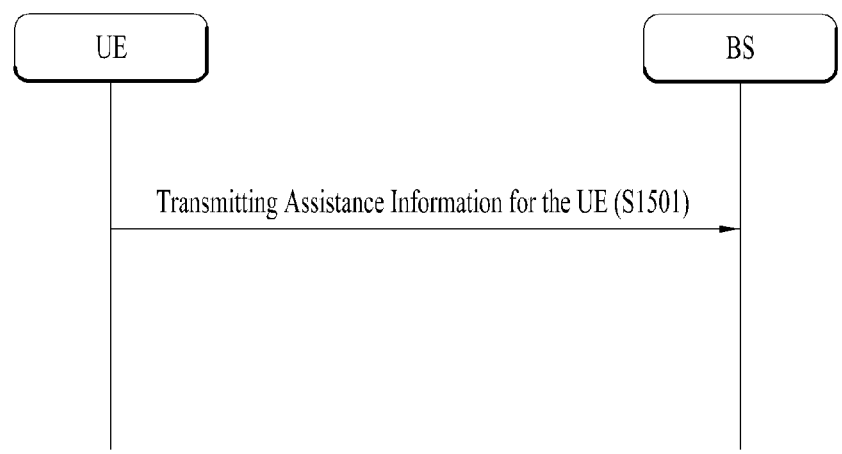
FIGS. 15 to 17 are diagrams illustrating an example of operation implementation of a UE and a base station (BS) according to an embodiment of the present disclosure.

Embodiment 1: UE Assistance Information for Assisting BS Operation Configuration As shown in FIG. 15, the UE may transmit assistance information for the UE to the BS to assist in configuring the operation of the BS (S1501). Here, the term "UE assistance information" is used to represent the information transmitted from the UE to the BS, but this is merely for simplicity. For example, when the UE has transmitted information to the BS to assist in configuring the operation of the BS, the information transmitted by the UE to the BS may correspond to the "assistance information for the UE" described in the present disclosure, regardless of whether a term employed for the information is the same as/different from the term used in the present disclosure.

Figure 16:
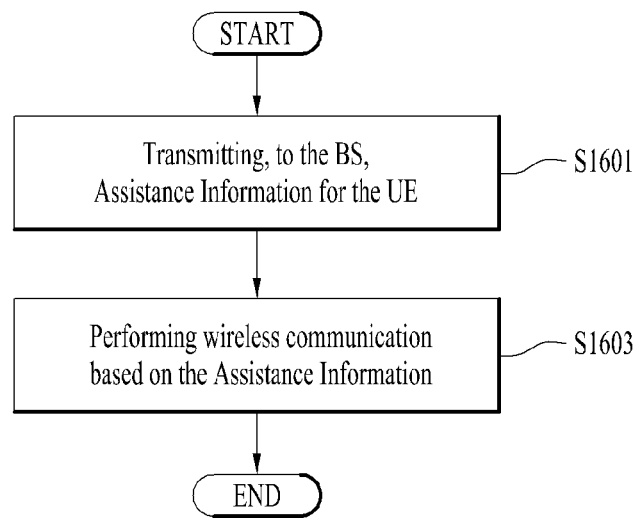

FIG. 16 is a flowchart illustrating operations related to transmission of assistance information of a UE from a UE perspective. Referring to FIG. 16, the UE may transmit assistance information for the UE to the BS (S1601), and perform wireless communication with the BS based on Embodiment 1 (S1603). In this case, each operation in FIG. 16 may be performed based on Embodiment 1. Each operation in FIG. 16 may be performed by a processor of the UE. Specifically, the operation of the UE according to Embodiment 1 may be performed by the processor of the UE corresponding to FIGS. 22 to 25. In addition, physical signals related to each operation based on Embodiment 1 may be transmitted and received by the transceiver of the UE under control of the processor. In other words, control information, data, and the like transmitted on the PDCCH and PDSCH may be processed by the processor of the UE. In addition, for transmission and reception of physical layer signals, the processor may include elements as shown in FIGS. 22 to 25.

Figure 17:
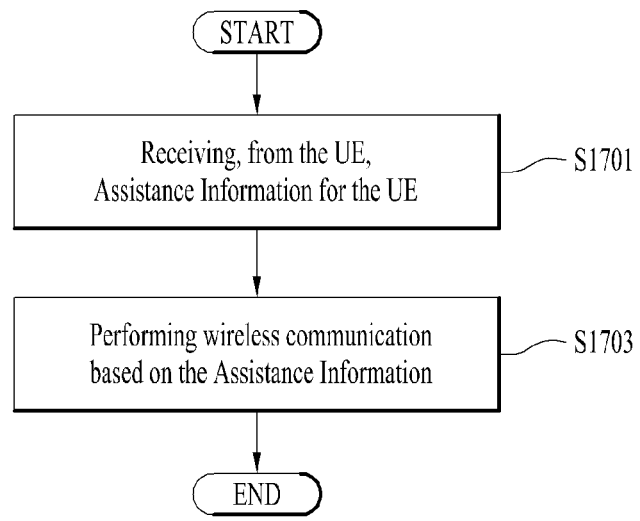

FIG. 17 is a flowchart illustrating operations related to reception of the assistance information for the UE from a BS perspective. Referring to FIG. 17, the BS may receive assistance information for the UE from the UE (S1701), and perform wireless communication with the UE based on Embodiment 1 (S1703). Each operation in FIG. 17 may be performed by a processor of the BS. Specifically, the operation of the BS according to Embodiment 1 may be performed by the processor of the BS corresponding to FIGS. 22 to 25. In addition, physical signals related to each operation based on Embodiment 1 may be transmitted/received by the transceiver of the BS under control of the processor. In other words, control information, data, and the like transmitted on the PDCCH and PDSCH may be processed by the processor of the BS. In addition, for transmission and reception of physical layer signals, the processor may include elements as shown in FIGS. 22 to 25.

Here, the assistance information for the UE may include implementation information that the UE may report to the BS. The assistance information for the UE may also include information on implementation of PDSCH decoding. The assistance information for the UE may also include information on implementation of channel estimation. The assistance information for the UE may also include information on a background state. Examples of information that may be included in the Assistance information for the UE are not limited to the above-described information, and any information that may be inferred based on Embodiment 1 may be included in the assistance information for the UE according to an embodiment of the present disclosure. Information that may be included in the assistance information for the UE may include all or part of the above-described information.

In a carrier aggregation situation, UE implementation for supporting transmission and reception of radio signals in a combination of a specific component carrier (CC) or a combination of a serving cell may differ among UEs. In addition, the UE implementation for supporting transmission and reception of radio signals in a specific active BWP may also differ among UEs.

In the NR system, when the BS selects a serving cell to be changed to a deactivated or dormant state among activated serving cells in order to achieve power saving of the UE, or when the BS changes the active BWP of the UE, the above-described UE implementation information may assist the BS in efficiently perform the change and/or selection. In this situation, embodiments (Embodiments 1-1(a) to 1-1(c)) of the implementation information that the UE may report to the BS are described below.

Embodiment 1-1(a)

The UE may report information related to a transmit/receive RF circuit and/or a power amplifier circuit of the UE to the BS. The information reported by the UE to the BS may include the number of transmit/receive RF circuits and/or power amplifier circuits of the UE, and a frequency range that may be supported by each of the transmit/receive RF circuits and/or power amplifier circuits of the UE. In addition, information on the frequency range that may be supported by each of the transmit/receive RF circuits and/or power amplifier circuits of the UE may include information on the starting and/or ending frequencies and length of the frequency range.

For example, the information on the frequency range may be expressed in resource block (RB) units or RB group units, and may be expressed as an absolute value in MHz. Informing the BS of the frequency range using the number of bits corresponding to each of the RBs or MHz included in the frequency range may require excessive signaling overhead. Accordingly, the frequency range may be divided into predefined granularity units and may be signaled to the BS using the number of bits corresponding thereto. In this case, the granularity unit may be defined as several/tens/hundreds of RBs or MHz.

According to Embodiment 1-1(a), even when aggregated cells for carrier aggregation of a specific UE are changed or BWP configuration is changed, additional reporting on UE implementation information may not be required. That is, once the UE reports the implementation information of the UE to the BS, there may be no need for additional reporting on the UE implementation information, even when aggregation cells are changed or BWP configuration is changed.

Embodiment 1-1(b)

The UE may report a power consumption level or a metric value corresponding thereto for each combination of specific cells among configured serving cells to the BS.

For example, when CC1 to CC5 are configured for the UE as aggregated cells, a metric value for power consumption when (CC1, CC2) is activated and a metric value for power consumption when (CC2, CC3, CC5) is activated may be reported to the BS. In addition, the BS may activate an appropriate cell according to a traffic situation based on the reported metric values.

The above-described metric for power consumption may be calculated by the UE based on a predefined model. For example, the required power may be calculated according to factors such as PDCCH monitoring, PDSCH decoding, and/or channel estimation. In this case, power consumed by each of the factors may be calculated, or a sum of power consumed by the factors may be calculated.

In addition, in calculating the metric for power consumption described above, a BWP operating in each configured serving cell may be considered. For example, power consumption may be calculated based on active BWPs of the configured serving cells.

It may not be guaranteed that the SCell is always activated. Accordingly, when the SCell is deactivated, the BWP to be used for power consumption calculation may be designated. For example, for a deactivated cell or a dormant cell, power consumption may be calculated based on (1) a BWP set in a higher layer. In this case, the BWP set in the higher layer may be the first active BWP. Alternatively, (2) power consumption may be calculated based on the BWP having the lowest index among the BWPs set in the deactivated cell or the dormant cell. Alternatively, (3) power consumption may be calculated based on the BWP in which the largest or smallest power consumption occurs. Alternatively, (4) power consumption may be calculated based on a default BWP or an initial BWP. Alternatively, (5) the entire frequency range of the corresponding serving cell may be assumed as a virtual BWP, and power consumption may be calculated based thereon.

The UE may report a power consumption level or a metric value corresponding thereto for a combination of BWPs of the serving cell and BWPs of the corresponding deactivated cell or dormant cell to the BS.

As another method, the UE may report a power consumption level for each unit bandwidth to the BS. Here, the unit bandwidth may be a region in which the control channel is decoded and PDSCH scheduling is performed based on the size of the Control Resource SET (CORESET) (e.g., CORESET bandwidth=unit bandwidth, CORESET interval=3 symbols). For example, the UE may report a power consumption level for each of unit RBs such as 24, 48, and 96 RBs, and the network may determine an operation for power saving of the UE based on the reported power consumption level. Here, the power consumption may mean power consumption for a control channel and/or data channel reception process. Additionally, the UE may also report a power consumption level for RF processing for each cell bandwidth (cell BW). Here, the power consumption may mean power consumption for signal reception such as RF module on/off and/or RF filtering from an RF perspective.

The network receiving a report on a power consumption level for reception of a control channel and/or a data channel and/or a power consumption level for reception of a signal from the UE may predict the power required in transmitting and receiving data using a specific CORESET bandwidth in a specific cell. Accordingly, efficient power saving may be implemented. When RF processing for each BWP is not needed, the power consumption level for each unit RB may be used as an indicator for estimating the power consumption for each bandwidth of the BWP.

Embodiment 1-1(c)

The UE may report to the BS a combination of serving cells in which transmission and reception of radio signals will be supported using a combination of the same RF circuit and/or the same power amplifier for the configured serving cells. In this case, the combination of the serving cells may be determined for each of transmission and reception of radio signals and reported to the BS.

For example, suppose that the UE reports to the BS that (CC1, CC2, CC3) is supported by a combination of the same RF circuit and/or the same power amplifier. Then, when the BS deactivates a specific cell according to a traffic situation, the deactivation may be performed from a serving cell other than CC1, CC2, and CC3.

In addition, in reporting the combination of the serving cells and power consumption thereof, a BWP operating in each configured serving cell may be considered. For example, a combination of serving cells supported by a combination of the same RF circuit and/or the same amplifier and calculation of power consumption thereof may be determined based on the active BWPs of the configured serving cells.

It may not be guaranteed that the SCell is always activated. Accordingly, when the SCell is deactivated, a BWP to be used to determine a combination of cells supported by the combination of the same RF circuit and/or the same amplifier and the power consumption thereof may be designated.

For example, for a deactivated cell or a dormant cell, a combination of cells may be determined based on (1) a BWP set in a higher layer. In this case, the BWP set in the higher layer may be the first active BWP. Alternatively, (2) a combination of cells may be determined based on the BWP having the lowest index among the BWPs set in the deactivated cell or the dormant cell. Alternatively, (3) a combination of cells may be determined based on the BWP in which the largest or smallest power consumption occurs. Alternatively, (4) a combination of cells may be determined based on a default BWP or an initial BWP. Alternatively, (5) the entire frequency range of the corresponding serving cell may be assumed as a virtual BWP, and a combination of cells may be determined based thereon.

Alternatively, a combination of a serving cell-BWP pair in which transmission and reception of radio signals will be supported using a combination of the same RF circuit and/or the same amplifier may be reported to the BS (for each of the transmission and reception). In this case, the combination of the serving cell-BWP pair may be determined for each of transmission and reception of radio signals and reported to the BS.

In Embodiment 1-1(c), when the UE reports information corresponding to power consumption to the BS in the form of a serving cell-BWP pair, the UE may report power consumption information about different BWPs to the BS. For example, the UE may report power consumption information about a combination of BWP1 of CC1 and BWP2 of CC1 to the BS.

A signal used for the UE to send a report to the BS in Embodiment 1-1 may be determined for each band and/or for each combination of bands.

A method of decoding a plurality of TBs or CBs included in a specific time duration for PDSCH decoding may be as configured as follows.

(1) A single LDPC (Low-density Parity-Check) decoder circuit may sequentially decode each of a plurality of TBs or CBs several times. Alternatively, (2) a plurality of LDPC decoder circuits may decode the plurality of TBs or CBs in parallel. In this case, the number of TBs or CBs may correspond to the number of LDPC decoder circuits. That is, the number of scheduled TBs or CBs may be determined according to the number of the plurality of LDPC decoder circuits. Alternatively, (3) there may be a plurality of LDPC decoder circuits, but the number of the plurality of LDPC decoder circuits may be smaller than the number of scheduled TBs or CBs. Depending on the implementation of the UE, additional parallel processing may be performed on one CB.

In addition, the time required for the LDPC decoder circuit to complete decoding may differ among the above methods. Accordingly, even when TBs having the same total size are transmitted, the power saving effect of the UE may differ among the methods for scheduling by the BS for the UE (e.g., a burst transmission method).

For example, in case (1) described above, when the time required to process TBs or CBs is set to be short by, for example, setting a high clock speed of each LDPC decoder circuit, it may be advantageous in terms of power saving to schedule TBs as consecutively as possible within a specific time duration to secure a large number of intervals that are not consecutively used. On the other hand, in case (3), even when the time required to process TB or CB is set to be relatively long by, for example, setting a low clock speed of each LDPC decoder circuit, and the power saving effect is not large due to background power despite that some of the LDPC decoder circuits used for parallel processing are turned off, it may be advantageous to schedule TBs or CBs as many as the number of LDPC decoder circuits.

Therefore, for power saving, the UE may report part or all of the information for implementation of PDSCH decoding to the BS. Embodiment 1-2 (Embodiments 1-2(a) to 1-2(d)) is a specific embodiment for this operation.

Embodiment 1-2(a)

The UE may report to the BS with the number of LDPC decoder circuits capable of parallel processing, time required for decoding, a metric value corresponding to the time required for decoding, standby power, a metric value corresponding to the standby power, and/or a power consumption level during operation of the LDPC decoder circuit and/or a metric value corresponding to the power consumption level. In this case, the time required for decoding may be expressed in units of us, ms or symbols, and the metric value corresponding to the time required for decoding may be expressed based on a clock rate. Based on the reported values, the BS may schedule transmission and reception of a radio signal for power saving according to a traffic situation and a latency requirement.

Embodiment 1-2(b)

The UE may report to the BS a peak data rate (or target data rate) for a power saving mode or a peak data rate (or target data rate) for each power saving level. In addition, the BS may schedule TBs for the UE based on the peak data rate or target data rate. When TBs of a data rate higher than or equal to the peak data rate or target data rate is scheduled in the power saving level or power saving mode given to the UE, all or part of the PDSCH decoding may be skipped. In this case, the UE may report an absolute value of the target data rate to the BS, or report a value obtained by applying a scaling factor to the peak data rate. The UE may also report to the BS the scaling factor to be applied to the peak data rate.

Embodiment 1-2(c)

The UE may report a limited buffer rate matching (LBRM) parameter for the power saving mode to the BS, or report an LBRM parameter such as R_LBRM and/or TBS_LBRM for each power saving level. Here, R_LBRM and/or TBS_LBRM may be defined based on a buffer rate or a transport block size (TBS), or may be defined in the form of a table.

The BS may schedule TBs for the UE based on the reported LBRM parameter. In addition, when TBs more than the number of TBs that may be covered by the LBRM parameters are scheduled in the power saving level or power saving mode given to the UE, all or part of the PDSCH decoding may be skipped. In this case, the UE may report absolute values of the LBRM parameters to the BS or report values obtained by applying a scaling factor to specific LBRM parameters. The UE may also report the scaling factor to be applied to the specific LBRM parameters. Here, the specific LBRM parameters may be default LBRM parameters defined by the BS or the UE as LBRM parameters used in a general situation.

Embodiment 1-2(d)

The UE may report to the BS the number of TBs, the number of CBs, the sum of TB sizes, and/or the sum of the CB sizes that may be expected to be received during a specific time duration for the power saving mode, or report the number of TBs, the number of CBs, the sum of TB sizes, and/or the sum of CB sizes that may be expected to be received during the specific time duration for each power saving level. Here, the specific time duration may correspond to a subframe length, or may correspond to 14 consecutive OFDM symbols in the normal CP and/or 12 consecutive OFDM symbols in the extended CP.

The number of LDPC decoder circuits to be used by the UE during the specific time duration may be limited through Embodiment 1 1-2(d). The BS may schedule TBs for the UE based on the number of TBs, the number of CBs, the sum of TB sizes, and/or the sum of CB sizes reported thereto. When TBs or CBs more than the number of TBs or CBs for the power saving level or power saving mode given to the UE are scheduled, all or part of PDSCH decoding may be skipped.

The information reported by the UE to the BS may be individually provided by the UE to the BS according to a base graph (BG) associated with the LDPC-based code rate. In addition, the information on the BG may be a condition under which each BG is used, and the UE may report implementation information according to each condition to the BS. In this case, the condition under which the BG is used may be defined as a combination of a coding rate and/or a TB size. In addition, the BG used according to each condition may differ among the LDPC decoder circuits used by the UE.

Although the description has been made focusing on implementation information for PDSCH decoding in Embodiment 1-2(d), it may also be extended to implementation information for PDCCH decoding including blind decoding and implementation information for PUSCH/PUCCH encoding. In this case, parameters to be reported may depend on a channel coding scheme.

Next, UE channel estimation may also be implemented differently for each UE. Accordingly, the change in power consumption level according to the transmission/reception bandwidth or the transmission/reception frequency range may also differ among UEs. Thus, in order to apply the power saving mode of the UE, it is necessary to efficiently reduce power used for channel estimation. Therefore, the UE may report part or all of the information on implementation of channel estimation to the BS. The following is a detailed example of information on implementation of channel estimation reported by the UE to the BS.

Embodiment 1-3(a)

The UE may report a power consumption level in channel estimation for a specific frequency range or a metric value corresponding to the power consumption level to the BS. Here, the specific frequency range may be defined as the number of RBs or RB groups that is indicated by a higher layer or is pre-configured. In this case, a channel estimation related parameter set, such as information on the corresponding frequency range and/or precoder granularity, may be predefined as a default value. Alternatively, the set may be configured through a channel estimation related configuration before being reported by the UE. In addition, when the UE reports a power consumption level related to the channel estimation or a metric value corresponding to the power consumption level, it may report information related thereto. For example, when the UE reports a power consumption level or a metric value corresponding to the power consumption level, the UE may also report power consumption information about channel estimation in one or more frequency ranges to the BS.

In this case, the total of power consumption for channel estimation in one or more frequency ranges may be reported as the power consumption information, or power consumption information about channel estimation in each of the one or more frequency ranges may be reported.

Embodiment 1-3(b)

The UE may report an upper limit of the number of physical resource block (PRB) bundles for a power saving mode or an upper limit of the number of PRB bundles per power saving level to the BS. Here, the upper limit of the number of PRB bundles may be an upper limit of the number of PRB bundles per PDSCH or an upper limit of the number of PRB bundles that may be included in a specific time duration. The specific time duration may be expressed in units of one or more symbols/slots/mini-slots/subframes.

The PRB bundle may be a unit in which the UE performs channel estimation. Accordingly, the number of PRB bundles may correspond to the number of times the UE performs channel estimation. In addition, the number of all PRB bundles may be counted for each symbol including DMRS. The UE may compare the number of scheduled PRB bundles with the upper limit of the number of PRB bundles and skip all or part of PDSCH decoding.

The UE may report information on the background state of the current UE to the BS. A specific example of the information on a corresponding background state may be configured as follows.

Embodiment 1-4(a)

The UE may report connection information about other RATs to the BS. For example, the other RATs may include WI-FI, Bluetooth, and Near Field Communication (NFC). Examples of the connection information may include whether the UE is connected to another RAT, the connection duration, and/or a received signal strength such as an Reference Signal Strength Indicator (RSSI) for the corresponding RAT.

Embodiment 1-4(b)

The UE may report location information about the UE and/or information about the state of the UE to the BS.

Examples of the location information and the state information may include a geographic location of the UE such as GPS (Global Positioning Sensor) coordinates or a barometer, and/or ambient temperature/humidity of the UE. In addition, information on the operation statistics of the UE may also be reported to the BS. The operation statistics of the UE may include the average speed of the UE and the degree of movement of the UE.

Figure 18:
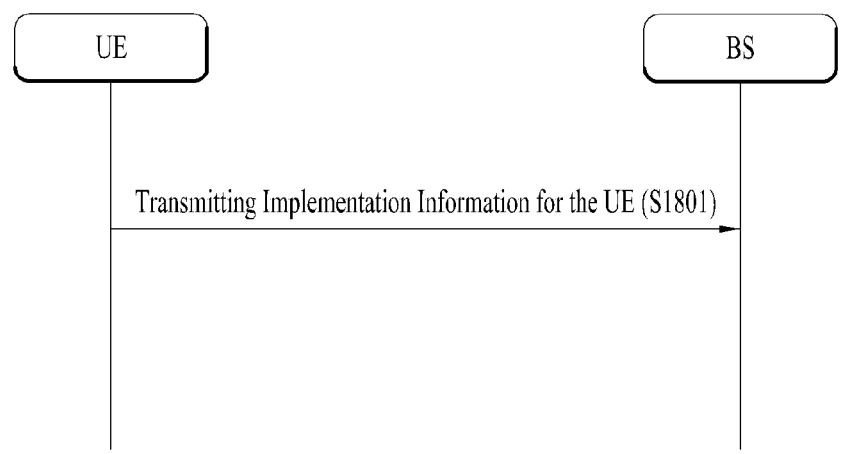
FIGS. 18 to 20 are diagrams illustrating an example of implementation of operations of a UE and a BS according to another embodiment of the present disclosure.

Embodiment 2: Operation in Power Saving Mode Based on UE Implementation Information Regarding the UE and the BS according to Embodiment 2, the UE may transmit implementation information for the UE to the BS as shown in FIG. 18 (S1801).

Here, the information transmitted from the UE to the BS is expressed as "implementation information for the UE", but this is merely for simplicity. For example, when the UE has transmitted information related to the implementation of the UE to the BS, the information transmitted by the UE to the BS may correspond to the "implementation information for the UE" described in the present disclosure, regardless of whether a term employed for the information is the same as/different from the term used in the present disclosure.

Figure 19:
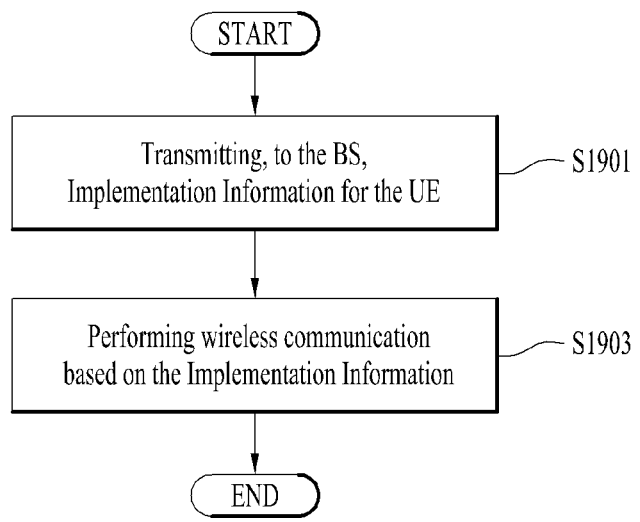

FIG. 19 is a diagram illustrating an implementation example of an operation related to transmission of the implementation information for a UE from a UE perspective.

Referring to FIG. 19, the UE may transmit implementation information for the UE to the BS (S1901), and perform wireless communication with the BS based on the transmitted implementation information for the UE (S1903). Here, the implementation information for the UE transmitted by the UE to the BS and the wireless communication performed with the BS based on the implementation information may be based Embodiment 2. Each operation in FIG. 19 may be performed by the processor of the UE. Specifically, the operation of the UE according to Embodiment 2 may be performed by the processor of the UE corresponding to FIGS. 22 to 25. In addition, physical signals related to each operation based on Embodiment 2 may be transmitted and received by the transceiver of the UE under control of the processor. In other words, control information, data, and the like transmitted on the PDCCH and PDSCH may be processed by the processor of the UE. In addition, for transmission and reception of a physical layer signal, the processor may include elements as shown in FIGS. 22 to 25.

Figure 20:
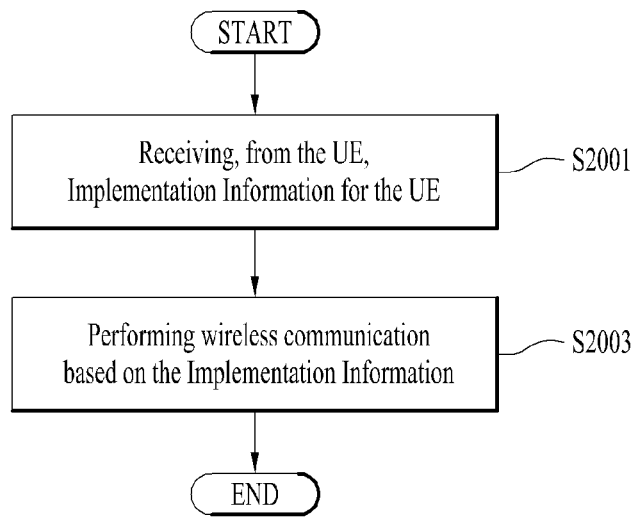

FIG. 20 illustrates an example related to an operation of receiving implementation information for a UE from a BS perspective. Referring to FIG. 20, the BS may receive implementation information for the UE (S2001). In addition, the BS may perform wireless communication with the UE based on the received implementation information for the UE (S2003). The implementation information for the UE received by the BS and the wireless communication performed based on the implementation information may be based on Embodiment 2.

Each operation in FIG. 20 may be performed by the processor of the BS. Specifically, the operation of the BS according to Embodiment 2 may be performed by the processor of the BS corresponding to FIGS. 22 to 25. In addition, physical signals related to each operation based on Embodiment 2 may be transmitted and received by the transceiver of the BS under control of the processor. In other words, control information, data, and the like transmitted on the PDCCH and PDSCH may be processed by the processor of the BS. In addition, for transmission and reception of physical layer signals, the processor may include elements as shown in FIGS. 22 to 25.

In the NR system, the UE may report part or all of the implementation information for power consumption to the BS. In addition, it may be expected that the BS will efficiently schedule transmission and reception of radio signals based on the implementation information. A different power saving mode or a power saving level may be set for the UE according to the remaining battery capacity. Here, the power saving mode or power saving level may be indicated from the network to the UE through higher layer signaling and/or physical layer signaling, or the UE may determine the power saving mode or the power saving level.

In this case, it is necessary to define a UE operation to be performed when scheduling of a radio signal beyond the UE implementation capability or implementation proposal according to the implementation information for the UE is configured for the UE. Thus, in Embodiment 2, a description will be given of a method for limited operation of the UE based on the implementation information for the UE reported to the BS for a specific power saving mode when the UE operates in the specific power saving mode.

The power saving mode may be indicated to the UE by the BS, or may be determined by the UE. For the parameter set for the limited operation for each power saving mode, the UE implementation information reported by the UE to the BS may be used, or the BS may configure a parameter set for the UE based on the report from the UE.

Embodiment 2-1

When a target data rate is set for a power consumption mode configured for a specific UE, the UE may not expect overlapped PDSCH transmission in a time unit that does not satisfy Equation 1 given below. Here, the overlapped PDSCH transmission may mean that a plurality of PDSCHs is transmitted within one slot.

$$\sum_{j=0}^{N-1}\{C'_j \times K_{r,j}/D_j\} \leq \text{DataRate} \quad \text{[Equation 1]}$$

Here, $C'_j$ is the number of CBs scheduled in the TB of the j-th PDSCH/PUSCH. $K_{r,j}$ is the number of bits included in the r-th CB of the j-th PDSCH/PUSCH. In addition, $D_j$ denotes a duration of the j-th PDSCH/PUSCH. This interval may be represented by a symbol duration*the number of symbols. Here, the symbol duration may be expressed as $Ts^\mu = 10^{-3}/(N_{symb}^{slot} \times 2^\mu)$, where $\mu$ denotes the numerology of PDSCH/PUSCH, and $N_{symb}^{slot}$ denotes the number of symbols per slot.

DataRate may be a target data rate set for a given power consumption mode. For example, the target data rate may be expressed as a peak data rate*alpha. Here, alpha may be a value set for a power consumption mode. In addition, the target data rate or alpha may have a value reported by the UE. Specifically, as mentioned in Embodiment 1-2(b), DataRate may be a target data rate reported by the UE as an absolute value, a value reported by applying a scaling factor to the peak data rate, or a value calculated based on the report on the scaling factor. Here, the scaling factor may correspond to alpha. PDSCHs/PUSCHs from j=0 to N-1 may be partially or fully overlapped and transmitted.

When a PDSCH or a combination of PDSCHs not satisfying Equation 1 occurs, the UE may skip decoding of all or part of the PDSCHs. In addition, the UE may select a PDSCH for which decoding is to be skipped or a PDSCH to preferentially decoded, based on a specific priority rule. For example, a PDSCH containing a broadcast message may be selected as a PDSCH decoding target with a high priority. Here, the PDSCH containing the broadcast message may mean a PDSCH for which PDCCH CRC masking and/or PDSCH data scrambling is determined by SI-RNTI, P-RNTI, RA-RNTI, SFI-RNTI, INT-RNTI and/or TPC-PUCCH/PUSCH-RNTI.

Embodiment 2-2

When an LBRM parameter set is configured for the power consumption mode that is set for a specific UE, and the conditions of Equation 2 below is satisfied, the UE may not expect TBs to be scheduled in 14 consecutive symbol durations for the normal CP or 12 consecutive symbol durations for the extended CP within the active BWP of the serving cell.

$$2^{max(0,\mu-\mu')} \cdot \sum_{i \in S} C'_i \cdot F_i > \frac{1}{R_{LBRM}} \cdot TBS_{LBRM} \quad \text{[Equation 2]}$$

Here, S may denote a set of TBs for PDSCH included in consecutive symbol durations.

$C'_i$ is the number of CBs scheduled in the i-th TB. $F_i$ for the i-th TB is may be defined as $$F_i = \max_{j=0,\dots,J-1} \left( \min(k^j_{0,i} + E^j_i, N_{cb,i}) \right).$$

Here, $k_{0,i}^j$ may denote a start position of a redundancy version (RV) for the j-th transmission of the i-th TB. $E_i^j$ corresponds to CBs scheduled for the j-th transmission of the i-th TB and may be defined as $E_i^j=\min(E_r)$.

$N_{cb,i}$ is the length of a cyclic buffer. J-1 is the current transmission of the i-th TB. μ' is the subcarrier spacing of a BWP having the largest number of PRBs among all BWPs configured on the carrier. μ is the subcarrier spacing of the active BWP. R_LBRM and TBS_LBRM may be set values for a given power consumption mode.

When a PDSCH or a combination of PDSCHs not satisfying Equation 2 occurs, the UE may skip decoding of all or part of the PDSCHs. In addition, the UE may select a PDSCH for which decoding is to be skipped or a PDSCH to preferentially decoded, based on a specific priority rule. For example, a PDSCH containing a broadcast message may be selected as a PDSCH decoding target with a high priority. Here, the PDSCH containing the broadcast message may mean a PDSCH for which PDCCH CRC masking and/or PDSCH data scrambling is determined by SI-RNTI, P-RNTI, RA-RNTI, SFI-RNTI, INT-RNTI and/or TPC-PUCCH/PUSCH-RNTI.

In addition, in Equation 2, the parameter for LBRM may have a value given in the case of not using the power saving mode (non-power saving mode). In Equation 2, a scaling factor may be additionally applied to the left part of the inequality sign or the right part of the inequality sign. Further, the parameter for the LBRM may have a value individually set for a power consumption mode without a scaling factor.

Embodiment 2-3

When the number of TBs or the number of CBs that are expected to be received during a specific time duration is set for the power consumption mode set for a specific UE, the UE may not expect overlapped PDSCH transmission exceeding the number of TBs or the number of CBs expected for the specific time duration. Here, the overlapped PDSCH transmission may mean that a plurality of PDSCHs is transmitted within one slot. In addition, the specific time duration may include 14 consecutive symbols in the case of the normal CP, and may include 12 consecutive symbols in the case of the extended CP. The specific time duration may mean a subframe length.

When a PDSCH or a combination of PDSCHs exceeding the number of TBs or CBs expected for the specific duration is scheduled, the UE may skip decoding for all or some of the PDSCHs. In addition, the UE may select a PDSCH for which decoding is to be skipped or a PDSCH to preferentially decoded, based on a specific priority rule. For example, a PDSCH containing a broadcast message may be selected as a PDSCH decoding target with a high priority. Here, the PDSCH containing the broadcast message may mean a PDSCH for which PDCCH CRC masking and/or PDSCH data scrambling is determined by SI-RNTI, P-RNTI, RA-RNTI, SFI-RNTI, INT-RNTI and/or TPC-PUCCH/PUSCH-RNTI.

Embodiment 2-4

When the upper limit of the number of PRB bundles is set for the power consumption mode set for a specific UE, the UE may not expect overlapped PDSCH transmission in which the number of PRB bundles that may be scheduled per PDSCH or the number of PRB bundles that may be scheduled for a specific time duration exceeds the upper limit. Here, the overlapped PDSCH transmission may mean that a plurality of PDSCHs is transmitted within one slot. In addition, the upper limit of the number of PRB bundles may be an upper limit of the number of PRB bundles that may be scheduled per PDSCH or an upper limit of the number of PRB bundles that may be scheduled for the specific time duration.

In addition, when a PDSCH or a combination of PDSCHs exceeding the upper limit of the number of PRB bundles is scheduled, the UE may skip decoding for all or some PDSCHs. In addition, the UE may select a PDSCH for which decoding is to be skipped or a PDSCH to preferentially decoded, based on a specific priority rule. For example, a PDSCH containing a broadcast message may be selected as a PDSCH decoding target with a high priority. Here, the PDSCH containing the broadcast message may mean a PDSCH for which PDCCH CRC masking and/or PDSCH data scrambling is determined by SI-RNTI, P-RNTI, RA-RNTI, SFI-RNTI, INT-RNTI and/or TPC-PUCCH/PUSCH-RNTI.

A combination of one or more of Embodiments 2-1 to 2-4 described above may be supported or operated according to the type of implementation information that the UE reports to the BS. For example, the UE may report to the BS a plurality of pieces of implementation information of the implementation information corresponding to Embodiments 2-1 to 2-4, and thus may perform an operation based on Embodiments 2-1 to 2-4.

In particular, when the UE reports a plurality of pieces of implementation information to the BS, the UE may determine whether to skip decoding of a PDSCH according to embodiments corresponding to the plurality of pieces of implementation information among Embodiments 2-1 to 2-4. In addition, a method, order, or combination of the operations corresponding to Embodiments 2-1 to 2-4 to be applied may be predefined.

For example, in order to minimize the number of PDSCHs for which decoding is skipped, in selecting a PDSCH for which decoding is to skipped, a PDSCH capable of satisfying a plurality of conditions among Embodiments 2-1 to 2-4 may be excluded first. Alternatively, in order to simplify the implementation of the UE, skipping of PDSCH decoding may be performed for each of Embodiments 2-1 to 2-4 in a specific order.

The various descriptions, functions, procedures, proposals, methods, and/or operation flowcharts of the present disclosure described herein may be applied to, but not limited to, various fields requiring wireless communication/ connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 21:
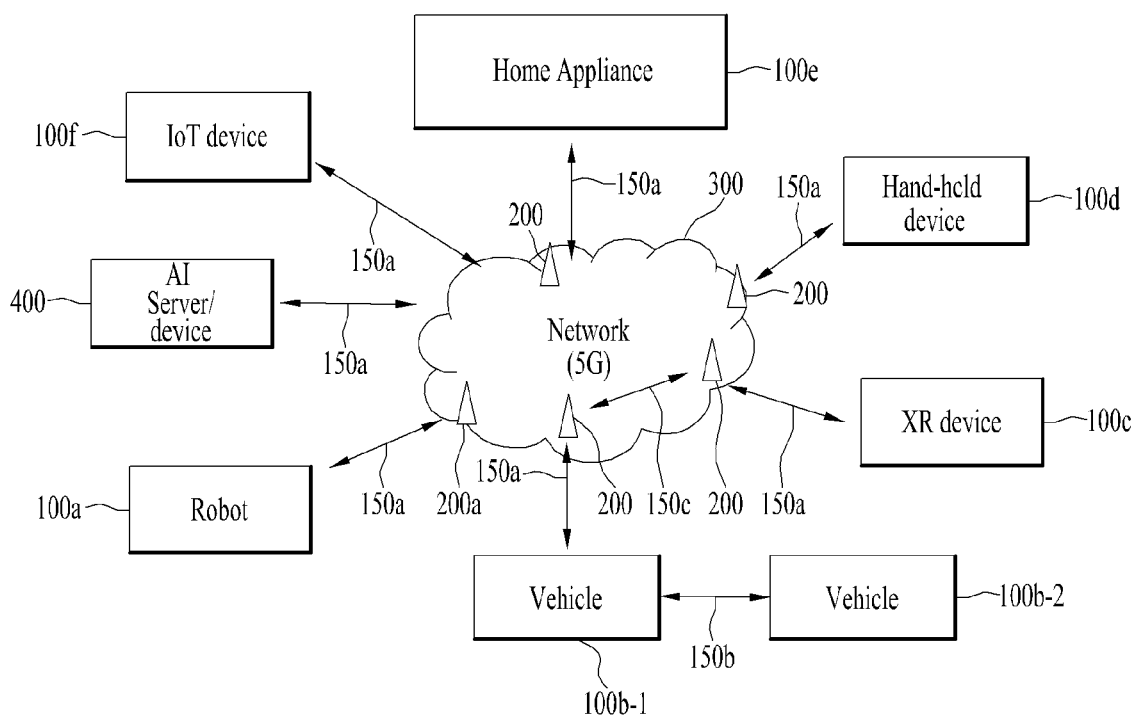
FIG. 21 shows an example communication system to which embodiments of the present disclosure are applied.

FIG. 21 illustrates a communication system 1 applied to the present disclosure.

Referring to FIG. 21, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/ demodulation, and resource mapping/demapping), and resource allocation processes, for transmitting/receiving wireless signals, may be performed based on the various proposals of the present disclosure.

Figure 22:
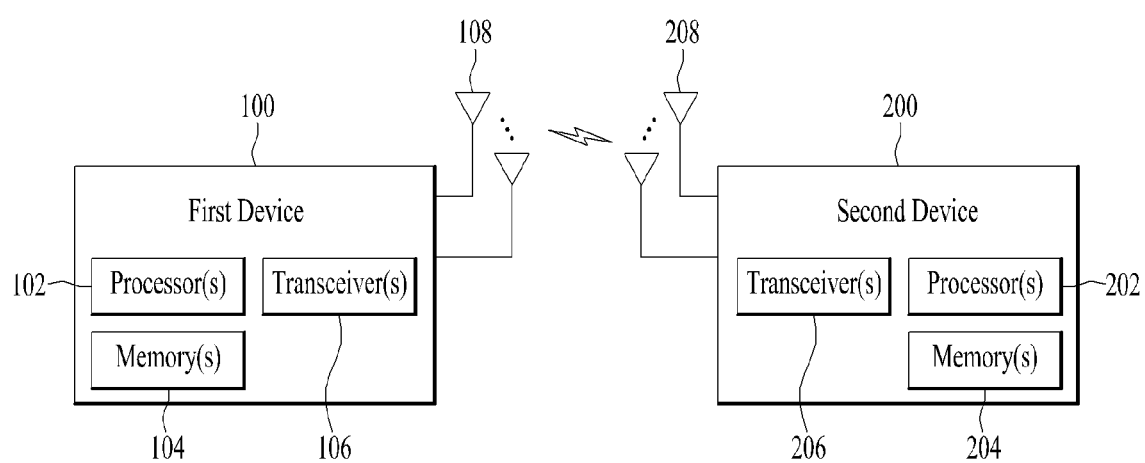
FIGS. 22 to 24 show examples of various wireless devices to which embodiments of the present disclosure are applied.

FIG. 22 illustrates wireless devices applicable to the present disclosure.

Referring to FIG. 22, a first wireless device 100 and a second wireless device 200 may transmit wireless signals through a variety of RATs (e.g., LTE and NR). {The first wireless device 100 and the second wireless device 200} may correspond to {the wireless device 100×and the BS 200} and/or {the wireless device 100× and the wireless device 100x} of FIG. 22.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/ chip.

Specifically, commands and/or operations that are controlled by the processor 102 of the first wireless device 100 and stored in the memory 104 according to an embodiment of the present disclosure will be described.

Although the following operations will be described based on the control operation of the processor 102 from the perspective of the processor 102, software code or the like for performing these operations may be stored in the memory 104.

The processor 102 may control the transceiver 106 to transmit assistance information of the first wireless device 100 to the second wireless device 200 based on Embodiment 1. In addition, the processor 102 may perform a control operation to perform wireless communication with the second wireless device 200 based on Embodiment 1.

The processor 102 may control the transceiver 106 to transmit the implementation information for the first wireless device 100 to the second wireless device 200. It may perform a control operation to perform wireless communication with the second wireless device 200 based on the transmitted implementation information for the first wireless device 100. Here, the implementation information for the first wireless device 100 transmitted by the first wireless device 100 to the second wireless device 200 and the wireless communication with the second wireless device 200 performed based on the implementation information may be based on Embodiment 2.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, commands and/or operations controlled by the processor 202 of the second wireless device 200 and stored in the memory 204 according to an embodiment of the present disclosure will be described.

Although the following operations will be described based on the control operation of the processor 202 from the perspective of the processor 202, software code or the like for performing these operations may be stored in the memory 204.

The processor 202 may control the transceiver 206 to receive assistance information of the first wireless device 100 from the first wireless device 100 based on Embodiment 1. It may perform a control operation to perform wireless communication with the first wireless device 100 based on Embodiment 1.

The processor 202 may control the transceiver 206 to receive implementation information for the first wireless device 100. In addition, it may perform a control operation to perform wireless communication with the first wireless device 100 based on the received implementation information for the first wireless device 100. Here, the implementation information for the first wireless device 100 received by the second wireless device 200 and the wireless communication performed based on the implementation information may be based on Embodiment 2.

Hereinafter, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 23:
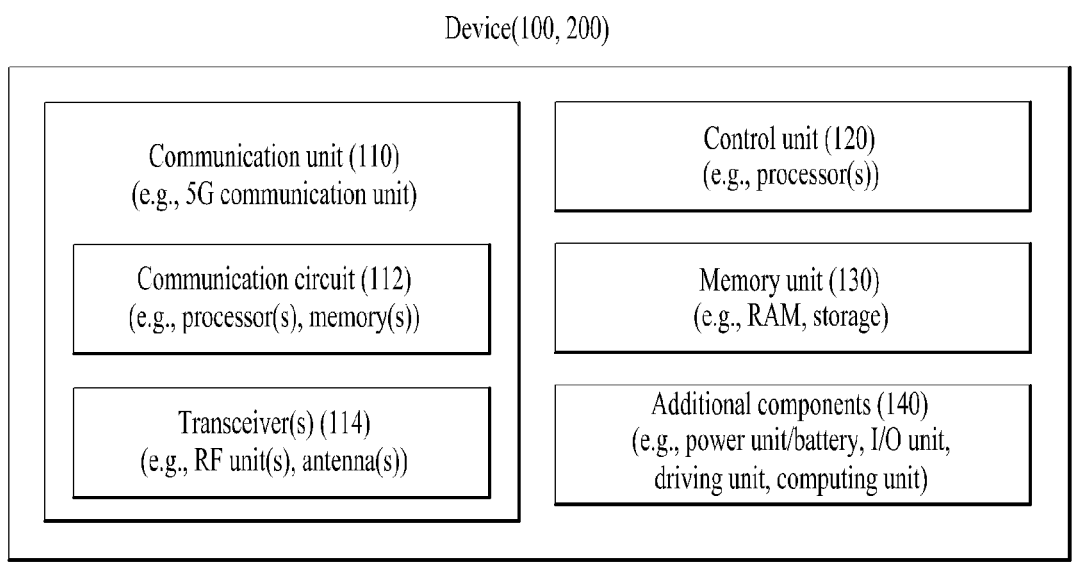

FIG. 23 illustrates another example of a wireless device applied to the present disclosure. The wireless device may be implemented in various forms according to a use case/service (refer to FIG. 21).

Referring to FIG. 23, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcasting terminal, a hologram device, a public safety device, an MTC device, a medical device, a FinTech device (or a finance device), a security device, a climate/environment device, the AI server/device (400 of FIG. 21), the BSs (200 of FIG. 21), a network node, or the like. The wireless device may be mobile or fixed according to a use case/service.

In FIG. 23, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 23 will hereinafter be described with reference to the attached drawings.

Figure 24:
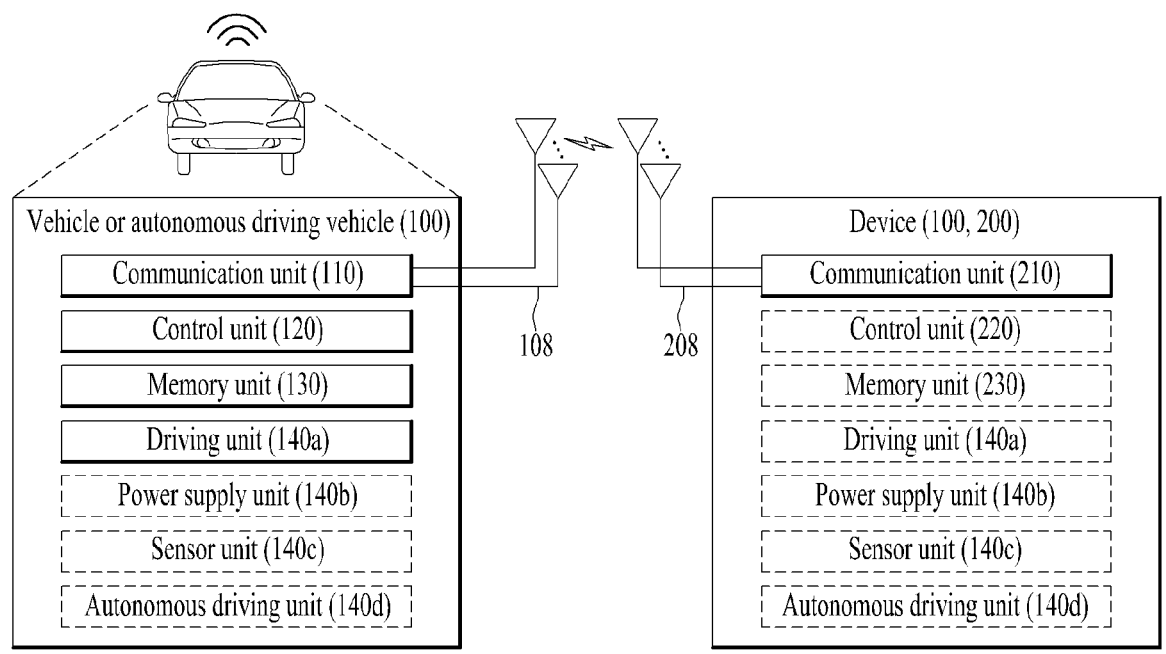

FIG. 24 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 24, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 25:
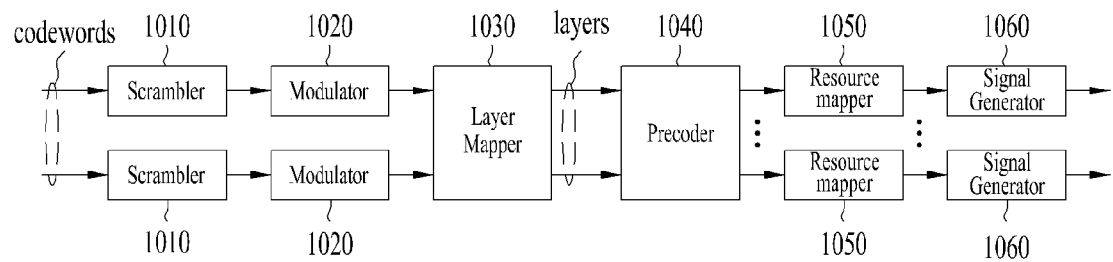
FIG. 25 shows an example signal processing circuit to which embodiments of the present disclosure are applied.

FIG. 25 illustrates a signal processing circuit for transmission (Tx) signals.

Referring to FIG. 25, the signal processing circuit 1000 may include a scrambler 1010, a modulator 1020, a layer mapper 1030, a precoder 1040, a resource mapper 1050, and a signal generator 1060. The operations/functions shown in FIG. 25 may be performed by the processors 102 and 202 and/or the transceivers 106 and 206 shown in FIG. 20. However, embodiments are not limited thereto. Hardware elements shown in FIG. 20 may be implemented by the processors 102 and 202 and/or the transceivers 106 and 206 shown in FIG. 20. For example, the blocks 1010 to 1060 may be implemented by the processors 102 and 202 shown in FIG. 20. In addition, the blocks 1010 to 1050 may be implemented by the processors 102 and 202 shown in FIG. 20, and the block 1060 may be implemented by the transceivers 106 and 206 shown in FIG. 20.

The codeword may be transformed into a radio signal (or a radio frequency (RF) signal) through the signal processing circuit 1000 shown in FIG. 25. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK(m-Phase Shift Keying), m-QAM(m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an Inverse Fast Fourier Transform (IFFT) module, a Cyclic Prefix (CP) inserter, a Digital-to-Analog Converter (DAC), and a frequency uplink converter.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a Fast Fourier Transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method for transmitting and receiving a downlink channel and an apparatus therefor have been described mainly focusing on examples thereof applied to the 5th generation NewRAT system, they may be applied to various wireless communication systems in addition to the 5th generation NewRAT system.

The invention claimed is:

1. A method for receiving a downlink channel by a user equipment (UE) in a wireless communication system, the method comprising:
receiving information related to a plurality of component carriers (CCs);
transmitting information related to power consumption of each of a plurality of CC groups, each CC group including at least one of the plurality of CCs; and
receiving the downlink channel through a CC determined based on the information related to the power consumption,
wherein, for a CC group including a deactivated CC, the UE calculates the power consumption of the CC group based on an assumption that a predetermined bandwidth part (BWP) of the deactivated CC is activated for receiving the downlink channel.

2. The method of claim 1, wherein the information related to the power consumption includes values obtained by measuring a power consumption level for a specific number of resource blocks (RBs).

3. The method of claim 1, wherein the same CC group is associated with the same radio frequency (RF) circuit.

4. The method of claim 1, wherein the UE is capable of communicating with at least one of anther UE, a network, a base station, and an autonomous driving vehicle.

5. An apparatus for receiving a downlink channel in a wireless communication system, the apparatus comprising:
at least one processor; and
at least one computer memory operably connectable to the at least one processor and storing instructions that, when executed by the at least one processor, perform operations comprising:
receiving information related to a plurality of component carriers (CCs);
transmitting information related to power consumption of each of a plurality of CC groups, each CC group including at least one of the plurality of CCs; and
receiving the downlink channel through a CC determined based on the information related to the power consumption,
wherein, for a CC group including a deactivated CC, the apparatus calculates the power consumption of the CC group based on an assumption that a predetermined bandwidth part (BWP) of the deactivated CC is activated for receiving the downlink channel.

6. The apparatus of claim 5, wherein the information related to the power consumption includes values obtained by measuring a power consumption level for a specific number of resource blocks (RBs).

7. The apparatus of claim 5, wherein the same CC group is associated with the same radio frequency (RF) circuit.

8. The apparatus of claim 5, wherein the apparatus is capable of communicating with at least one of a user equipment (UE), a network, a base station, and an autonomous driving vehicle.

9. A user equipment (UE) for receiving a downlink channel in a wireless communication system, the terminal comprising:
at least one transceiver;
at least one processor; and
at least one computer memory operably connectable to the at least one processor and storing instructions that, when executed by the at least one processor, perform operations comprising:
receiving information related to a plurality of component carriers (CCs) through the at least one transceiver;
transmitting, through the at least one transceiver, information related to power consumption of each of a plurality of CC groups, each CC group including at least one of the plurality of CCs; and
receiving, through the at least one transceiver, the downlink channel through a CC determined based on the information related to the power consumption,
wherein, for a CC group including a deactivated CC, the UE calculates the power consumption of the CC group based on an assumption that a predetermined bandwidth part (BWP) of the deactivated CC is activated for receiving the downlink channel.

10. The method of claim 1, wherein the predetermined BWP is determined based on higher layer signaling.

11. The method of claim 1, wherein the predetermined BWP is a lowest indexed BWP in the deactivated CC.

12. The method of claim 1, wherein the predetermined BWP is a largest BWP in the deactivated CC.

13. The method of claim 1, wherein the predetermined BWP is an initial BWP in the deactivated CC.

\* \* \* \* \*